US008584239B2

(12) United States Patent
Aziz et al.

(10) Patent No.: US 8,584,239 B2
(45) Date of Patent: *Nov. 12, 2013

(54) VIRTUAL MACHINE WITH DYNAMIC DATA FLOW ANALYSIS

(75) Inventors: Ashar Aziz, Menlo Park, CA (US); Ramesh Radhakrishnan, Menlo Park, CA (US); Osman Ismael, Menlo Park, CA (US)

(73) Assignee: FireEye, Inc., Milpitas, CA (US)

( * ) Notice: Subject to any disclaimer, the term of this patent is extended or adjusted under 35 U.S.C. 154(b) by 1344 days.

This patent is subject to a terminal disclaimer.

(21) Appl. No.: 11/471,072

(22) Filed: Jun. 19, 2006

(65) Prior Publication Data

US 2007/0250930 A1 Oct. 25, 2007

Related U.S. Application Data

(63) Continuation-in-part of application No. 11/409,355, filed on Apr. 20, 2006, which is a continuation-in-part of application No. 11/096,287, filed on Mar. 31, 2005, and a continuation-in-part of application No. 11/151,812, filed on Jun. 13, 2005, and a continuation-in-part of application No. 11/152,286, filed on Jun. 13, 2005.

(60) Provisional application No. 60/559,198, filed on Apr. 1, 2004, provisional application No. 60/579,953, filed on Jun. 14, 2004, provisional application No. 60/579,910, filed on Jun. 14, 2004.

(51) Int. Cl.
*G06F 12/14* (2006.01)
*G06F 11/30* (2006.01)

(52) U.S. Cl.
USPC ............... 726/24; 726/23; 726/25; 713/182; 713/187; 713/188

(58) Field of Classification Search
USPC ............ 726/22–24; 714/43; 713/201; 711/53
See application file for complete search history.

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 | 1/2008 |
| WO | 0206928 A2 | 1/2002 |
| WO | WO0223805 A2 | 3/2002 |

OTHER PUBLICATIONS

Costa, M. et al. "Vigilante: End-to-End Containment of Internet Worms," SOSP '05, Oct. 23-26, 2005, Association for Computing Machinery, Inc., Brighton U.K.

(Continued)

*Primary Examiner* — Kaveh Abrishamkar
(74) *Attorney, Agent, or Firm* — Blakely, Sokoloff, Taylor & Zafman LLP

(57) ABSTRACT

A suspicious activity capture system can comprise a tap configured to copy network data from a communication network, and a controller coupled to the tap. The controller is configured to receive the copy of the network data from the tap, analyze the copy of the network data with a heuristic to determine if the network data is suspicious, flag the network data as suspicious based on the heuristic determination, and concurrently simulate transmission of the network data to a plurality of destination devices.

27 Claims, 14 Drawing Sheets

(56) References Cited

U.S. PATENT DOCUMENTS

| | | | |
|---|---|---|---|
| 5,440,723 A | 8/1995 | Arnold et al. | |
| 5,657,473 A | 8/1997 | Killean et al. | |
| 5,978,917 A | 11/1999 | Chi | |
| 6,269,330 B1 | 7/2001 | Cidon et al. | |
| 6,298,445 B1 | 10/2001 | Shostack | |
| 6,357,008 B1 | 3/2002 | Nachenberg | |
| 6,424,627 B1* | 7/2002 | Sørhaug et al. | 370/241 |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,832,367 B1 | 12/2004 | Choi et al. | |
| 6,895,550 B2 | 5/2005 | Kanchirayappa et al. | |
| 6,898,632 B2 | 5/2005 | Gordy | |
| 6,981,279 B1* | 12/2005 | Arnold et al. | 726/22 |
| 7,007,107 B1 | 2/2006 | Ivchenko et al. | |
| 7,043,757 B2* | 5/2006 | Hoefelmeyer et al. | 726/24 |
| 7,069,316 B1 | 6/2006 | Gryaznov | |
| 7,080,408 B1 | 7/2006 | Pak | |
| 7,093,239 B1 | 8/2006 | van der Made | |
| 7,100,201 B2 | 8/2006 | Izatt | |
| 7,159,149 B2 | 1/2007 | Spiegel | |
| 7,231,667 B2 | 6/2007 | Jordan | |
| 7,240,364 B1 | 7/2007 | Branscomb et al. | |
| 7,240,368 B1 | 7/2007 | Roesch | |
| 7,287,278 B2 | 10/2007 | Liang | |
| 7,308,716 B2 | 12/2007 | Danford et al. | |
| 7,356,736 B2 | 4/2008 | Natvig | |
| 7,386,888 B2 | 6/2008 | Liang | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,480,773 B1* | 1/2009 | Reed | 711/153 |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,523,493 B2 | 4/2009 | Liang | |
| 7,530,104 B1 | 5/2009 | Thrower et al. | |
| 7,540,025 B2 | 5/2009 | Tzadikario | |
| 7,565,550 B2 | 7/2009 | Liang et al. | |
| 7,603,715 B2 | 10/2009 | Costa | |
| 7,639,714 B2 | 12/2009 | Stolfo et al. | |
| 7,644,441 B2 | 1/2010 | Schmidt et al. | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,779,463 B2 | 8/2010 | Stolfo et al. | |
| 7,784,097 B1 | 8/2010 | Stolfo et al. | |
| 7,849,506 B1 | 12/2010 | Dansey et al. | |
| 7,904,959 B2 | 3/2011 | Sidiroglou et al. | |
| 7,908,660 B2 | 3/2011 | Bahl | |
| 7,996,556 B2 | 8/2011 | Raghavan et al. | |
| 7,996,905 B2 | 8/2011 | Arnold et al. | |
| 8,028,338 B1 | 9/2011 | Schneider et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 2001/0047326 A1 | 11/2001 | Broadbent et al. | |
| 2002/0018903 A1 | 2/2002 | Kokubo et al. | |
| 2002/0038430 A1 | 3/2002 | Edwards et al. | |
| 2002/0091819 A1 | 7/2002 | Melchione et al. | |
| 2002/0144156 A1 | 10/2002 | Copeland, III | |
| 2002/0162015 A1 | 10/2002 | Tang | |
| 2002/0184528 A1* | 12/2002 | Shevenell et al. | 713/201 |
| 2002/0188887 A1 | 12/2002 | Largman et al. | |
| 2002/0194490 A1 | 12/2002 | Halperin et al. | |
| 2003/0074578 A1 | 4/2003 | Ford et al. | |
| 2003/0084318 A1 | 5/2003 | Schertz | |
| 2003/0115483 A1 | 6/2003 | Liang | |
| 2003/0188190 A1 | 10/2003 | Aaron | |
| 2003/0200460 A1 | 10/2003 | Morota et al. | |
| 2004/0019832 A1 | 1/2004 | Arnold et al. | |
| 2004/0047356 A1 | 3/2004 | Bauer | |
| 2004/0083408 A1* | 4/2004 | Spiegel et al. | 714/43 |
| 2004/0111531 A1 | 6/2004 | Staniford et al. | |
| 2004/0165588 A1 | 8/2004 | Pandya | |
| 2004/0236963 A1 | 11/2004 | Danford et al. | |
| 2004/0243349 A1* | 12/2004 | Greifeneder et al. | 702/183 |
| 2004/0249911 A1 | 12/2004 | Alkhatib | |
| 2004/0268147 A1 | 12/2004 | Wiederin et al. | |
| 2005/0033960 A1 | 2/2005 | Vialen et al. | |
| 2005/0033989 A1 | 2/2005 | Poletto | |
| 2005/0086523 A1 | 4/2005 | Zimmer et al. | |
| 2005/0091513 A1 | 4/2005 | Mitomo | |
| 2005/0114663 A1 | 5/2005 | Cornell | |
| 2005/0125195 A1 | 6/2005 | Brendel | |
| 2005/0157662 A1 | 7/2005 | Bingham et al. | |
| 2005/0183143 A1 | 8/2005 | Anderholm | |
| 2005/0201297 A1 | 9/2005 | Peikari | |
| 2005/0210533 A1 | 9/2005 | Copeland | |
| 2005/0238005 A1 | 10/2005 | Chen et al. | |
| 2005/0265331 A1 | 12/2005 | Stolfo | |
| 2006/0015715 A1 | 1/2006 | Anderson | |
| 2006/0021054 A1 | 1/2006 | Costa et al. | |
| 2006/0075496 A1 | 4/2006 | Carpenter et al. | |
| 2006/0095968 A1 | 5/2006 | Portolani | |
| 2006/0101516 A1 | 5/2006 | Sudaharan | |
| 2006/0101517 A1 | 5/2006 | Banzhof et al. | |
| 2006/0117385 A1 | 6/2006 | Mester et al. | |
| 2006/0123477 A1 | 6/2006 | Raghavan | |
| 2006/0143709 A1 | 6/2006 | Brooks et al. | |
| 2006/0161983 A1 | 7/2006 | Cothrell | |
| 2006/0161987 A1* | 7/2006 | Levy-Yurista | 726/24 |
| 2006/0164199 A1 | 7/2006 | Gilde et al. | |
| 2006/0184632 A1 | 8/2006 | Marino et al. | |
| 2006/0191010 A1 | 8/2006 | Benjamin | |
| 2006/0221956 A1 | 10/2006 | Narayan et al. | |
| 2006/0288417 A1 | 12/2006 | Bookbinder et al. | |
| 2007/0006288 A1 | 1/2007 | Mayfield et al. | |
| 2007/0006313 A1 | 1/2007 | Porras et al. | |
| 2007/0016951 A1 | 1/2007 | Piccard | |
| 2007/0033645 A1 | 2/2007 | Jones | |
| 2007/0038943 A1 | 2/2007 | FitzGerald et al. | |
| 2007/0064689 A1 | 3/2007 | Shin et al. | |
| 2007/0094730 A1* | 4/2007 | Bhikkaji et al. | 726/24 |
| 2007/0174915 A1 | 7/2007 | Gribble et al. | |
| 2007/0192500 A1 | 8/2007 | Lum | |
| 2007/0192858 A1 | 8/2007 | Lum | |
| 2007/0198275 A1 | 8/2007 | Malden et al. | |
| 2007/0250930 A1 | 10/2007 | Aziz | |
| 2007/0271446 A1 | 11/2007 | Nakamura | |
| 2008/0005782 A1 | 1/2008 | Aziz | |
| 2008/0072326 A1 | 3/2008 | Danford et al. | |
| 2008/0080518 A1 | 4/2008 | Hoeflin et al. | |
| 2008/0120722 A1 | 5/2008 | Sima et al. | |
| 2008/0141376 A1 | 6/2008 | Clausen | |
| 2008/0222729 A1 | 9/2008 | Chen et al. | |
| 2008/0263665 A1 | 10/2008 | Ma et al. | |
| 2008/0295172 A1 | 11/2008 | Bohacek | |
| 2008/0301810 A1 | 12/2008 | Lehane | |
| 2009/0031423 A1 | 1/2009 | Liu et al. | |
| 2009/0083369 A1 | 3/2009 | Marmor | |
| 2009/0083855 A1 | 3/2009 | Apap et al. | |
| 2009/0089879 A1 | 4/2009 | Wang | |
| 2009/0094697 A1 | 4/2009 | Provos et al. | |
| 2009/0271867 A1 | 10/2009 | Zhang | |
| 2009/0300761 A1 | 12/2009 | Park et al. | |
| 2009/0328221 A1 | 12/2009 | Blumfield et al. | |
| 2010/0054278 A1 | 3/2010 | Stolfo et al. | |
| 2010/0077481 A1 | 3/2010 | Polyakov et al. | |
| 2010/0083376 A1 | 4/2010 | Pereira | |
| 2010/0115621 A1 | 5/2010 | Staniford et al. | |
| 2010/0192223 A1 | 7/2010 | Ismael et al. | |
| 2010/0251104 A1 | 9/2010 | Massand | |
| 2010/0281102 A1 | 11/2010 | Chinta et al. | |
| 2010/0281541 A1 | 11/2010 | Stolfo et al. | |
| 2010/0281542 A1 | 11/2010 | Stolfo et al. | |
| 2010/0287260 A1 | 11/2010 | Peterson et al. | |
| 2011/0047620 A1 | 2/2011 | Mahaffey et al. | |

(56) References Cited

U.S. PATENT DOCUMENTS

| | | |
|---|---|---|
| 2011/0093951 A1 | 4/2011 | Aziz |
| 2011/0099633 A1 | 4/2011 | Aziz |
| 2011/0247072 A1 | 10/2011 | Staniford et al. |
| 2011/0307955 A1 | 12/2011 | Kaplan et al. |
| 2011/0314546 A1 | 12/2011 | Aziz et al. |
| 2012/0079596 A1 | 3/2012 | Thomas et al. |
| 2012/0084859 A1 | 4/2012 | Radinsky et al. |
| 2012/0174186 A1 | 7/2012 | Aziz et al. |
| 2012/0174218 A1 | 7/2012 | McCoy et al. |

OTHER PUBLICATIONS

Chaudet, C. et al. "Optimal Positioning of Active and Passive Monitoring Devices," International Conference on Emerging Networking Experiments and Technologies, Proceedings of the 2005 ACM Conference on Emerging Network Experiment and Technology, Oct. 2005, pp. 71-82, CoNEXT '05, Toulousse, France.

Crandall, J.R. et al., "Minos:Control Data Attack Prevention Orthognal to Memory Model," 37th International Symposium on Microarchitecture, Dec. 2004, Portland, Oregon.

Kim, H. et al., "Autograph: Toward Automated, Distributed Worm Signature Detection," Proceedings of the 13th Usenix Security Symposium (Security 2004), Aug. 2004, pp. 271-286, San Diego.

Kreibich, C. et al., "Honeycomb—Creating Intrusion Detection Signatures Using Honeypots," 2nd Workshop on Hot Topics in Networks (HotNets-11), 2003, Boston, USA.

Newsome, J. et al., "Polygraph: Automatically Generating Signatures for Polymorphic Worms," In Proceedings of the IEEE Symposium on Security and Privacy, May 2005.

Newsome, J. et al., "Dynamic Taint Analysis for Automatic Detection, Analysis, and Signature Generation of Exploits on Commodity Software," In Proceedings of the 12th Annual Network and Distributed System Security, Symposium (NDSS '05), Feb. 2005.

Singh, S. et al., "Automated Worm Fingerprinting," Proceedings of the ACM/USENIX Symposium on Operating System Design and Implementation, Dec. 2004, San Francisco, California.

Margolis, P.E., Random House Webster's "Computer & Internet Dictionary 3rd Edition," ISBN 0375703519, Dec. 1998.

Whyte et al. "DNS-Based Detection of Scannin Works in an Enterprise Network," Proceedings of the 12th Annual Network and Distributed System Security Symposium, Feb. 2005. 15 pages.

Kristoff, J. "Botnets, Detection and Mitigation: DNS-Based Techniques," NU Security Day 2005, 23 pages.

IEEE Xplore Digital Library Search results for "detection of unknown computer worms". http://ieeexplore.ieee.org/search/searchresult.jsp?SortField=Score&SortOrder=desc&ResultC . . . Accessed on Aug. 28, 2009.

AltaVista Advanced Search Results. "Event Orchestrator". http://www.altavista.com/web/results?Itag=ody&pg=aq&aqmode=s& aqa=Event+Orchestrator . . . Accessed on Sep. 3, 2009.

AltaVista Advanced Search Results. "attack vector identifier". http://www.altavista.com/web/results?Itag=ody&pg=aq&aqmode=s& aqa=attack+vector+ide . . . Accessed on Sep. 15, 2009.

IEEE Xplore Digital Library Search Results for "detection of unknown computer worms". Http//ieeexplore.ieee.org/searchresult. jsp?SortField=Score&SortOrder=desc&ResultC . . . Accessed on Aug. 28, 2009.

AltaVista Advanced Search Results. "Event Orchestrator". Http://www.altavista.com/web/results?Itag=ody&pg=aq& aqmode=aqa=Event+Orchestrator . . . Accessed on Sep. 3, 2009.

AltaVista Advanced Search Results. "attack vector identifier". Http://www.altavista.com/web/results?Itag=ody&pg=aq& aqmode=aqa=Event+Orchestrator . . . Accessed on Sep. 15, 2009.

International Search Report and Written Opinion mailed May 10, 2012 in Application No. PCT/US12/21916.

International Search Report and Written Opinion mailed May 25, 2012 in Application No. PCT/US12/26402.

Silicon Defense, "Worm Containment in the Internal Network", Mar. 2003, pp. 1-25.

Nojiri, D. et al., "Cooperative Response Strategies for Large Scale Attack Mitigation", DARPA Information Survivability Conference and Exposition, Apr. 22-24, 2003, vol. 1, pp. 293-302.

Moore, D. et al., "Internet Quarantine: Requirements for Containing Self-Propagating Code", INFOCOM, Mar. 30-Apr. 3, 2003, vol. 3, pp. 1901-1910.

Williamson, Matthew M., "Throttling Viruses: Restricting Propagation to Defeat Malicious Mobile Code", ACSAC Conference, Dec. 2002, Las Vegas, NV, USA, pp. 1-9.

"Packet", Microsoft Computer Dictionary, Microsoft Press, Mar. 2002, 1 pg.

\* cited by examiner

VIRTUAL MACHINE WITH DYNAMIC DATA FLOW ANALYSIS

CROSS-REFERENCE TO RELATED APPLICATIONS

This application is a continuation-in-part of U.S. patent application Ser. No. 11/409,355, filed Apr. 20, 2006, entitled "Heuristic Based Capture with Replay to Virtual Machine", which is a continuation-in-part of U.S. patent application Ser. No. 11/096,287, filed Mar. 31, 2005, entitled "System and Method of Detecting Computer Worms", and is a continuation-in-part of U.S. patent application Ser. No. 11/151,812, filed Jun. 13, 2005, entitled "System and Method of Containing Computer Worms," and is a continuation-in-part of U.S. patent application Ser. No. 11/152,286, filed Jun. 13, 2005, entitled "Computer Worm Defense System and Method"; U.S. patent application Ser. No. 11/096,287 claims the benefit of U.S. Provisional Application No. 60/559,198, filed Apr. 1, 2004, U.S. patent application Ser. No. 11/151,812 claims the benefit of U.S. Provisional Application No. 60/579,953, filed Jun. 14, 2004, and U.S. patent application Ser. No. 11/152,286 claims the benefit of U.S. Provisional Application No. 60/579,910, filed Jun. 14, 2004, all of which are incorporated by reference herein.

BACKGROUND

1. Field of the Invention

The present invention relates generally to computer networks, and more particularly to preventing the spread of malware.

2. Background Art

Detecting and distinguishing computer worms from ordinary communications traffic within a computer network is a challenging problem. Moreover, modern computer worms operate at an ever increasing level of sophistication and complexity. Consequently, it has become increasingly difficult to detect computer worms.

A computer worm can propagate through a computer network by using active propagation techniques. One such active propagation technique is to select target systems to infect by scanning network address space (e.g., a scan-directed computer worm). Another active propagation technique is to use topological information from an infected system to actively propagate the computer worm in the system (e.g., a topologically directed computer worm). Still another active propagation technique is to select target systems to infect based on some combination of previously generated lists of target systems (e.g., a hit-list directed computer worm).

In addition to the active propagation techniques, a computer worm may propagate through a computer network by using passive propagation techniques. One passive propagation technique is for the worm to attach itself to a normal network communication not initiated by the computer worm itself (e.g., a stealthy or passive contagion computer worm). The computer worm then propagates through the computer network in the context of normal communication patterns not directed by the computer worm.

It is anticipated that next-generation computer worms will have multiple transport vectors, use multiple target selection techniques, have no previously known signatures, and will target previously unknown vulnerabilities. It is also anticipated that next generation computer worms will use a combination of active and passive propagation techniques and may emit chaff traffic (i.e., spurious traffic generated by the computer worm) to cloak the communication traffic that carries the actual exploit sequences of the computer worms. This chaff traffic will be emitted in order to confuse computer worm detection systems and to potentially trigger a broad denial-of-service by an automated response system.

Approaches for detecting computer worms in a computer system include misuse detection and anomaly detection. In misuse detection, known attack patterns of computer worms are used to detect the presence of the computer worm. Misuse detection works reliably for known attack patterns but is not particularly useful for detecting novel attacks. In contrast to misuse detection, anomaly detection has the ability to detect novel attacks. In anomaly detection, a baseline of normal behavior in a computer network is created so that deviations from this behavior can be flagged as anomalous. The difficulty inherent in this approach is that universal definitions of normal behavior are difficult to obtain. Given this limitation, anomaly detection approaches strive to minimize false positive rates of computer worm detection.

In one suggested computer worm containment system, detection devices are deployed in a computer network to monitor outbound network traffic and detect active scan directed computer worms within the computer network. To achieve effective containment of these active computer worms, as measured by the total infection rate over the entire population of systems, the detection devices are widely deployed in the computer network in an attempt to detect computer worm traffic close to a source of the computer worm traffic. Once detected, these computer worms are contained by using an address blacklisting technique. This computer worm containment system, however, does not have a mechanism for repair and recovery of infected computer networks.

In another suggested computer worm containment system, the protocols (e.g., network protocols) of network packets are checked for standards compliance under an assumption that a computer worm will violate the protocol standards (e.g., exploit the protocol standards) in order to successfully infect a computer network. While this approach may be successful in some circumstances, this approach is limited in other circumstances. Firstly, it is possible for a network packet to be fully compatible with published protocol standard specifications and still trigger a buffer overflow type of software error due to the presence of a software bug. Secondly, not all protocols of interest can be checked for standards compliance because proprietary or undocumented protocols may be used in a computer network. Moreover, evolutions of existing protocols and the introduction of new protocols may lead to high false positive rates of computer worm detection when "good" behavior cannot be properly and completely distinguished from "bad" behavior. Encrypted communications channels further complicate protocol checking because protocol compliance cannot be easily validated at the network level for encrypted traffic.

In another approach to computer worm containment, "honey farms" have been proposed. A honey farm includes "honeypots" that are sensitive to probe attempts in a computer network. One problem with this approach is that probe attempts do not necessarily indicate the presence of a computer worm because there may be legitimate reasons for probing a computer network. For example, a computer network can be legitimately probed by scanning an Internet Protocol (IP) address range to identify poorly configured or rogue devices in the computer network. Another problem with this approach is that a conventional honey farm does not detect passive computer worms and does not extract signatures or transport vectors in the face of chaff emitting computer worms.

Another approach to computer worm containment assumes that computer worm probes are identifiable at a given worm sensor in a computer network because the computer worm probes will target well known vulnerabilities and thus have well known signatures which can be detected using a signature-based intrusion detection system. Although this approach may work for well known computer worms that periodically recur, such as the CodeRed computer worm, this approach does not work for novel computer worm attacks exploiting a zero-day vulnerability (e.g., a vulnerability that is not widely known).

One suggested computer worm containment system attempts to detect computer worms by observing communication patterns between computer systems in a computer network. In this system, connection histories between computer systems are analyzed to discover patterns that may represent a propagation trail of the computer worm. In addition on to false positive related problems, the computer worm containment system does not distinguish between the actual transport vector of a computer worm and a transport vector including a spuriously emitted chaff trail. As a result, simply examining malicious traffic to determine the transport vector can lead to a broad denial of service (DOS) attack on the computer network. Further, the computer worm containment system does not determine a signature of the computer worm that can be used to implement content filtering of the computer worm. In addition, the computer worm containment system does not have the ability to detect stealthy passive computer worms, which by their very nature cause no anomalous communication patterns.

In light of the above, there exists a need for an effective system and method of containing computer worms.

SUMMARY OF THE INVENTION

An exemplary unauthorized activity capture system, according to some embodiments of the invention, comprises a tap configured to copy network data from a communication network, and a controller coupled to the tap. The controller is configured to receive the copy of the network data from the tap, analyze the copy of the network data with a heuristic to determine if the network data is suspicious, flag the network data as suspicious based on the heuristic determination, and concurrently simulate the transmission of the network data to a plurality of destination devices.

The tap can be further configured to copy other network data from the communication network. Further, the controller can be configured to receive the copy of the other network data from the tap, analyze the copy of the other network data with a heuristic to flag the other network data as suspicious, concurrently simulate transmission of the second network data to an other plurality of destination devices, and concurrently analyze a first response from the plurality of destination devices and a second response form the other plurality of destination devices.

In some embodiments, the heuristic can be configured to detect the network data sent to an unassigned internet protocol address.

An unauthorized activity capture system can comprises a tap configured to copy network data from a communication network, and a controller coupled to the tap. The controller is configured to receive the copy of the network data from the tap, analyze the copy of the network data with a heuristic, retrieve a plurality of virtual machines, configure a first replayer to concurrently replicate the network data to the plurality of virtual machines, and analyze a first response by any of the plurality of virtual machines to identify unauthorized activity.

An unauthorized activity capture method may comprise copying network data from a communication network, analyzing the copied network data with a heuristic, and concurrently orchestrating the transmission of the network data to a plurality of destination devices to identify unauthorized activity. Concurrently orchestrating the transmission of the network data to a plurality of destination devices may comprise retrieving a plurality of virtual machines configured to receive the network data, configuring a first replayer to concurrently transmit the network data to the plurality of virtual machines, and analyzing a first response by any of the plurality of virtual machines to identify unauthorized activity.

A computer readable medium can computer readable code configured to direct a processor to copy network data from a communication network, analyze the copied network data with a heuristic, and concurrently orchestrate transmission of the network data to a plurality of destination device to identify unauthorized activity. Concurrently orchestrating transmission of the network data may comprise directing the processor to retrieve a plurality of virtual machines configured to receive the network data, configure a replayer to concurrently transmit the network data to the plurality of virtual machines, and concurrently simulate the transmission of the network data to the plurality of virtual machines.

DETAILED DESCRIPTION

Figure 1:
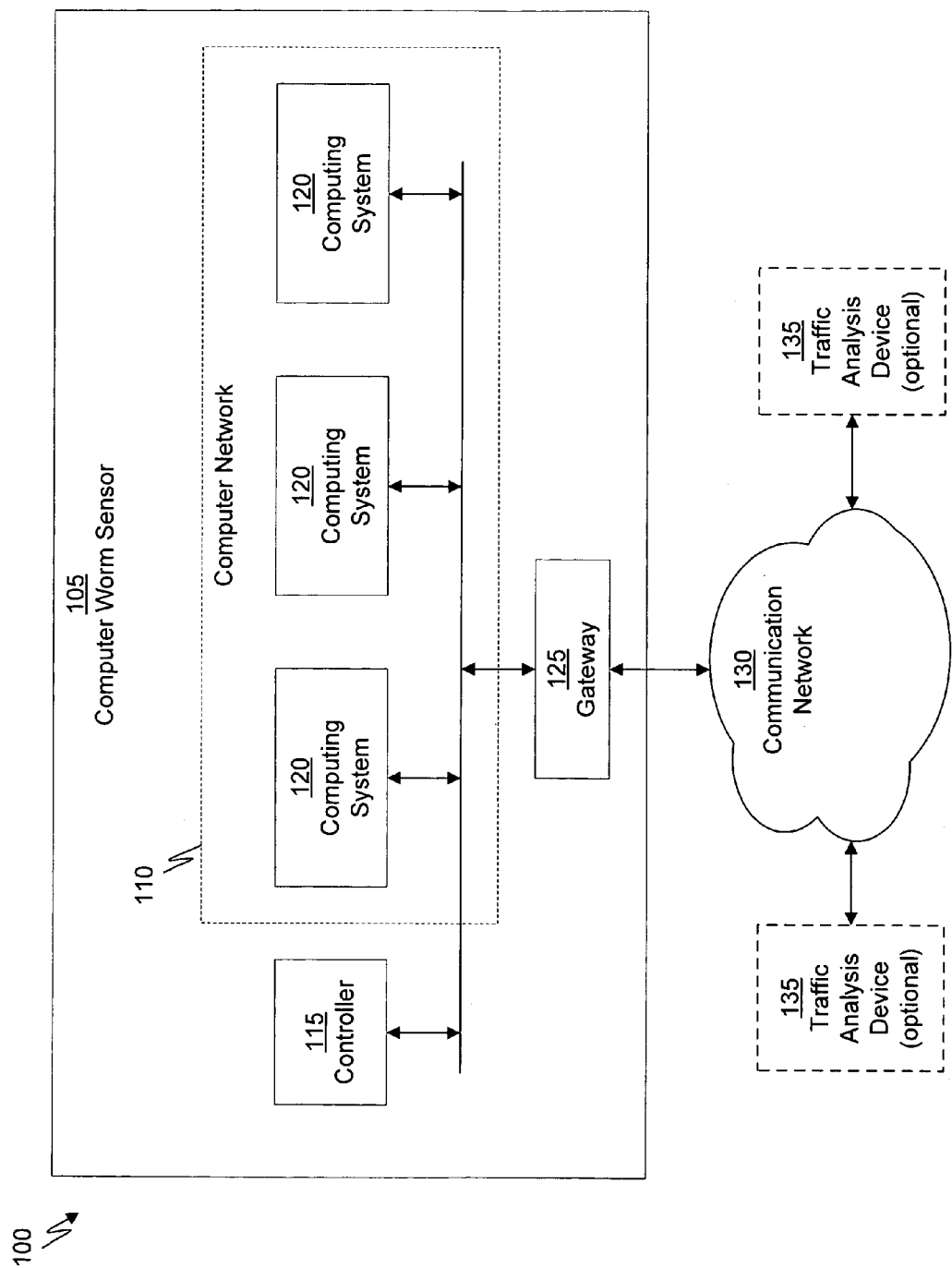
FIG. 1 depicts a computing environment in which a worm sensor can be implemented, in accordance with one embodiment of the present invention.

An unauthorized activity containment system in accordance with one embodiment of the present invention detects computer suspicious activity, models the suspicious activity to identify unauthorized activity, and blocks the unauthorized activity. The unauthorized activity containment system can flag suspicious activity and then model the effects of the suspicious activity to identify malware and/or unauthorized activity associated with a computer user. The threshold for detecting the suspicious activity may be set low whereby a single command may be flagged as suspicious. In other embodiments, the threshold may be higher to flag suspicious activity of a combination of commands or repetitive commands.

Unauthorized activity can include any unauthorized and/or illegal computer activity. Unauthorized activity can also include activity associated with malware or illegitimate computer use. Malware is software created and distributed for malicious purposes and can take the form of viruses, worms, or trojan horses, for example. A virus is an intrusive program that infects a computer file by inserting a copy of itself in the file. The copy is usually executed when the file is loaded into memory, allowing the virus to infect still other files. A worm is a program that propagates itself across computers, usually by creating copies of itself in each computer's memory. A worm might duplicate itself in one computer so often that it causes the computer to crash. A trojan horse is a destructive program disguised as a game, utility, or application. When run, a trojan horse can harm the computer system while appearing to do something useful.

Illegitimate computer use can comprise intentional or unintentional unauthorized access to data. A hacker may intentionally seek to damage a computer system. A hacker, or computer cracker, is an individual that seeks unauthorized access to data. One example of a common attack is a denial-of-service attack where the hacker configures one or more computers to constantly request access to a target computer. The target computer may become overwhelmed by the requests and either crash or become too busy to conduct normal operations. While some hackers seek to intentionally damage computer systems, other computer users may seek to gain rights or privileges of a computer system in order to copy data or access other computers on a network. Such computer use can unintentionally damage computer systems or corrupt data.

Detection of worms can be accomplished through the use of a computer worm detection system that employs a decoy computer network having orchestrated network activities. The computer worm detection system is configured to permit computer worms to infect the decoy computer network. Alternately, rather than infect the decoy network, communications that are characteristic of a computer worm can be filtered from communication traffic and replayed in the decoy network. Detection is then based on the monitored behavior of the decoy computer network. Once a computer worm has been detected, an identifier of the computer worm is determined and provided to a computer worm blocking system that is configured to protect one or more computer systems of a real computer network. In some embodiments, the computer worm detection system can generate a recovery script to disable the computer worm and repair damage caused to the one or more computer systems, and in some instances, the computer worm blocking system initiates the repair and recovery of the infected systems.

FIG. 1 depicts an exemplary computing environment 100 in which a computer worm sensor 105 is implemented, in accordance with one embodiment of the present invention. In various embodiments, the computer worm sensor 105 functions as a computer worm detection system, as is described more fully herein. The computer worm sensor 105 includes a controller 115, a computer network 110 (e.g., a hidden or decoy network), and a gateway 125 (e.g., a wormhole system). The computer network 110 includes one or more computing systems 120 (e.g., hidden systems) in communication with each other. The controller 115 and the gateway 125 are in communication with the computer network 110 and the computing systems 120. Additionally, the gateway 125 is in communication with a communication network 130 (e.g., a production network). The communication network 130 can be a public computer network such as the Internet, or a private computer network, such as a wireless telecommunication network.

Optionally, the computer worm sensor 105 may include one or more traffic analysis devices 135 in communication with the communication network 130. A traffic analysis device 135 analyzes network traffic in the communication network 130 to identify network communications characteristic of a computer worm. The traffic analysis device 135 can then selectively duplicate the identified network communications and provide the duplicated network communications to the controller 115. The controller 115 replays the duplicated network communications in the computer network 110 to determine whether the network communications include a computer worm.

The computing systems 120 are computing devices typically found in a computer network. For example, the computing systems 120 can include computing clients or servers. As a further example, the computing systems 120 can include gateways and subnets in the computer network 110. Each of the computing systems 120 and the gateway 125 can have different hardware or software profiles.

The gateway 125 allows computer worms to pass from the communication network 130 to the computer network 110. The computer worm sensor 105 can include multiple gateways 125 in communication with multiple communication networks 130. These communication networks 130 may also be in communication with each other. For example, the communication network 130 can be part of the Internet or in communication with the Internet. In one embodiment, each of the gateways 125 can be in communication with multiple communication networks 130.

The controller 115 controls the operation of the computing systems 120 and the gateway 125 to orchestrate network activities in the computer worm sensor 105. In one embodiment, the orchestrated network activities are a predetermined sequence of network activities in the computer network 110, which represents an orchestrated behavior of the computer network 110. In this embodiment, the controller 115 monitors the computer network 110 to determine a monitored behavior of the computer network 110 in response to the orchestrated network activities. The controller 115 then compares the monitored behavior of the computer network 110 with a predetermined orchestrated behavior to identify an anomalous behavior.

Anomalous behavior may include a communication anomaly, like an unexpected network communication, or an execution anomaly, for example, an unexpected execution of computer program code. If the controller 115 identifies an anomalous behavior, the computer network 110 is deemed to be infected with a computer worm. In this way, the controller 115 can detect the presence of a computer worm in the computer network 110 based on an anomalous behavior of the computer worm in the computer network 110. The controller 115 then creates an identifier (i.e., a "definition" of the anomalous behavior), which can be used for detecting the computer worm in another computer network, such as the communication network 130.

The identifier determined by the controller 115 for a computer worm in the computer network 110 can be a signature that characterizes the anomalous behavior of the computer worm. The signature can then be used to detect the computer worm in another computer network. In one embodiment, the signature indicates a sequence of ports in the computer network 110 along with data used to exploit each of the ports. for instance, the signature can be a set of tuples $\{(p_1, c_1), (p_2, c_2), \ldots\}$, where $p_n$ represents a Transfer Control Protocol (TCP) or a User Datagram Protocol (UDP) port number, and $c_n$ is signature data contained in a TCP or UDP packet used to exploit a port associated with the port number. For example, the signature data can be 16-32 bytes of data in a data portion of a data packet.

The controller 115 can determine a signature of a computer worm based on a uniform resource locator (URL), and can generate the signature by using a URL filtering device, which represents a specific case of content filtering. For example, the controller 115 can identify a uniform resource locator (URL) in data packets of Hyper Text Transfer Protocol (HTTP) traffic and can extract a signature from the URL. Further, the controller 115 can create a regular expression for the URL and include the regular expression in the signature such that each tuple of the signature includes a destination port and the regular expression. In this way, a URL filtering device can use the signature to filter out network traffic associated with the URL. The controller 115, in some embodiments, can also filter data packet traffic for a sequence of tokens and dynamically produce a signature having a regular expression that includes the token sequence.

Alternatively, the identifier may be a vector (e.g., a propagation vector, an attack vector, or a payload vector) that characterizes an anomalous behavior of the computer worm in the computer network 110. For example, the vector can be a propagation vector (i.e., a transport vector) that characterizes a sequence of paths traveled by the computer worm in the computer network 110. The propagation vector may include a set $\{p_1, p_2, p_3, \ldots\}$, where $p_n$ represents a port number (e.g., a TCP or UDP port number) in the computer network 110 and identifies a transport protocol (e.g., TCP or UDP) used by the computer worm to access the port. Further, the identifier may be a multi-vector that characterizes multiple propagation vectors for the computer worm. In this way, the vector can characterize a computer worm that uses a variety of techniques to propagate in the computer network 110. These techniques may include dynamic assignment of probe addresses to the computing systems 120, network address translation (NAT) of probe addresses to the computing systems 120, obtaining topological service information from the computer network 110, or propagating through multiple gateways 125 of the computer worm sensor 105.

The controller 115 can be configured to orchestrate network activities (e.g., network communications or computing services) in the computer network 110 based on one or more orchestration patterns. In one embodiment, the controller 115 generates a series of network communications based on an orchestration pattern to exercise one or more computing services (e.g., Telnet, FTP, or SMTP) in the computer network 110. In this embodiment, the orchestration pattern produces an orchestrated behavior (e.g., an expected behavior) of the computer network 110 in the absence of computer worm infection. The controller 115 then monitors network activities in the computer network 110 (e.g., the network communications and computing services accessed by the network communications) to determine a monitored behavior of the computer network 110, and compares the monitored behavior with the orchestrated behavior. If the monitored behavior does not match the orchestrated behavior, the computer network 110 is deemed to be infected with a computer worm. The controller 115 then identifies an anomalous behavior in the monitored behavior (e.g., a network activity in the monitored behavior that does not match the orchestration pattern) and determines an identifier for the computer worm based on the anomalous behavior. In other embodiments, the controller 115 is configured to detect unexpected network activities in the computer network 110.

In another embodiment, an orchestrated pattern is associated with a type of network communication. In this embodiment, the gateway 125 identifies the type of a network communication received by the gateway 125 from the communication network 130 before propagating the network communication to the computer network 110. The controller 115 then selects an orchestration pattern based on the type of network communication identified by the gateway 125 and orchestrates network activities in the computer network 110 based on the selected orchestration pattern. In the computer network 110, the network communication accesses one or more computing systems 120 via one or more ports to access one or more computing services (e.g., network services) provided by the computing systems 120.

For example, the network communication may access an FTP server on one of the computing systems 120 via a well-known or registered FTP port number using an appropriate network protocol (e.g., TCP or UDP). In this example, the orchestration pattern includes the identity of the computing system 120, the FTP port number, and the appropriate network protocol for the FTP server. If the monitored behavior of the computer network 110 does not match the orchestrated behavior expected from the orchestration pattern, the network communication is deemed to be infected with a computer worm. The controller 115 then determines an identifier for the computer worm based on the monitored behavior, as is described in more detail herein.

The controller 115 orchestrates network activities in the computer network 110 such that the detection of anomalous behavior in the computer network 110 is simple and highly reliable. All behavior (e.g., network activities) of the computer network 110 that is not part of an orchestrated behavior represents an anomalous behavior. In alternative embodiments, the monitored behavior of the computer network 110 that is not part of the orchestrated behavior is analyzed to determine whether any of the monitored behavior is an anomalous behavior.

In another embodiment, the controller 115 periodically orchestrates network activities in the computer network 110 to access various computing services (e.g., web servers or file servers) in the communication network 130. In this way, a computer worm that has infected one of these computing services may propagate from the communication network 130 to the computer network 110 via the orchestrated network activities. The controller 115 then orchestrates network activities to access the same computing services in the computer network 110 and monitors a behavior of the computer network 110 in response to the orchestrated network activities. If the computer worm has infected the computer network 110, the controller 115 detects the computer worm based on an anomalous behavior of the computer worm in the monitored behavior, as is described more fully herein.

In one embodiment, a single orchestration pattern exercises all available computing services in the computer network 110. In other embodiments, each orchestration pattern exercises selected computing services in the computer network 110, or the orchestration patterns for the computer network 110 are dynamic (e.g., vary over time). For example, a user of the computer worm sensor 105 may add, delete, or modify the orchestration patterns to change the orchestrated behavior of the computer network 110.

In one embodiment, the controller 115 orchestrates network activities in the computer network 110 to prevent a computer worm in the communication network 130 from recognizing the computer network 110 as a decoy. For example, a computer worm may identify and avoid inactive computer networks, as such networks may be decoy computer networks deployed for detecting the computer worm (e.g., the computer network 110). In this embodiment, therefore, the controller 115 orchestrates network activities in the computer network 110 to prevent the computer worm from avoiding the computer network 110.

In another embodiment, the controller 115 analyzes both the packet header and the data portion of data packets in network communications in the computer network 110 to detect anomalous behavior in the computer network 110. For example, the controller 115 can compare the packet header and the data portion of the data packets with those of data packets propagated pursuant to an orchestration pattern to determine whether the network communications data packets constitute anomalous behavior in the computer network 110. Because the network communication propagated pursuant to the orchestration pattern is an orchestrated behavior of the computer network 110, the controller 115 avoids false positive detection of anomalous behavior in the computer network 110, which can occur in anomaly detection systems operating on unconstrained computer networks. In this way, the controller 115 reliably detects computer worms in the computer network 110 based on the anomalous behavior.

To further illustrate what is meant by reliable detection of anomalous behavior, for example, an orchestration pattern can be used that is expected to cause emission of a sequence of data packets (a, b, c, d) in the computer network 110. The controller 115 orchestrates network activities in the computer network 110 based on the orchestration pattern and monitors the behavior (e.g., measures the network traffic) of the computer network 110. If the monitored behavior of the computer network 110 includes a sequence of data packets (a, b, c, d, e, f), then the extra data packets (e, f) represent an anomalous behavior (e.g., anomalous traffic). This anomalous behavior may be caused by an active computer worm propagating inside the computer network 110.

As another example, if an orchestration pattern is expected to cause emission of a sequence of data packets (a, b, c, d) in the computer network 110, but the monitored behavior includes a sequence of data packets (a, b', c', d), the modified data packets (b', c') represent an anomalous behavior in the computer network 110. This anomalous behavior may be caused by a passive computer worm propagating inside the computer network 110.

In various further embodiments, the controller 115 generates a recovery script for the computer worm, as is described more fully herein. The controller 115 can then execute the recovery script to disable (e.g., destroy) the computer worm in the computer worm sensor 105 (e.g., remove the computer worm from the computing systems 120 and the gateway 125). Moreover, the controller 115 can output the recovery script for use in disabling the computer worm in other infected computer networks and systems.

In another embodiment, the controller 115 identifies the source of a computer worm based on a network communication containing the computer worm. For example, the controller 115 may identify an infected host (e.g., a computing system) in the communication network 130 that generated the network communication containing the computer worm. In this example, the controller 115 transmits the recovery script via the gateway 125 to the host in the communication network 130. In turn, the host executes the recovery script to disable the computer worm in the host. In various further embodiments, the recovery script is also capable of repairing damage to the host caused by the computer worm.

The computer worm sensor 105 can export the recovery script, in some embodiments, to a bootable compact disc (CD) or floppy disk that can be loaded into infected hosts to repair the infected hosts. For example, the recovery script can include an operating system for the infected host and repair scripts that are invoked as part of the booting process of the operating system to repair an infected host. Alternatively, the computer worm sensor 105 may provide the recovery script to an infected computer network (e.g., the communication network 130) so that the computer network 130 can direct infected hosts in the communication network 130 to reboot and load the operating system in the recovery script.

In another embodiment, the computer worm sensor 105 uses a per-host detection and recovery mechanism to recover hosts (e.g., computing systems) in a computer network (e.g., the communication network 130). The computer worm sensor 105 generates a recovery script including a detection process for detecting the computer worm and a recovery process for disabling the computer worm and repairing damage caused by the computer worm. The computer worm sensor 105 provides the recovery script to hosts in a computer network and each host executes the detection process. If the host detects the computer worm, the host then executes the recovery process. In this way, a computer worm that performs random corruptive acts on the different hosts (e.g., computing systems) in the computer network can be disabled in the computer network and damage to the computer network caused by the computer worm can be repaired.

The computer worm sensor 105 can be a single integrated system, such as a network device or a network appliance, which is deployed in the communication network 130 (e.g., a commercial or military computer network). Alternatively, the computer worm sensor 105 may include integrated software for controlling operation of the computer worm sensor 105, such that per-host software (e.g., individual software for each computing system 120 and gateway 125) is not required.

The computer worm sensor 105 can also be a hardware module, such as a combinational logic circuit, a sequential logic circuit, a programmable logic device, or a computing device, among others. Alternatively, the computer worm sensor 105 may include one or more software modules containing computer program code, such as a computer program, a software routine, binary code, or firmware, among others. The software code can be contained in a permanent memory storage device such as a compact disc read-only memory (CD-ROM), a hard disk, or other memory storage device, such as for example a computer readable medium having computer readable code, wherein a processor can be directed by the computer readable code. In various embodiments, the computer worm sensor 105 includes both hardware and software modules.

In some embodiments, the computer worm sensor 105 is substantially transparent to the communication network 130 and does not substantially affect the performance or availability of the communication network 130. In another embodiment, the software in the computer worm sensor 105 may be hidden such that a computer worm cannot detect the computer worm sensor 105 by checking for the existence of files (e.g., software programs) in the computer worm sensor 105 or by performing a simple signature check of the files. In one example, the software configuration of the computer worm sensor 105 is hidden by employing one or more well-known polymorphic techniques used by viruses to evade signature-based detection.

In another embodiment, the gateway 125 facilitates propagation of computer worms from the communication network 130 to the computer network 110, with the controller 115 orchestrating network activities in the computer network 110 to actively propagate the computer worms from the communication network 130 to the computer network 110. For example, the controller 115 can originate one or more network communications between the computer network 110 and the communication network 130. In this way, a passive computer worm in the communication network 130 can attach to one of the network communications and propagate along with the network communication from the communication network 130 to the computer network 110. Once the computer worm is in the computer network 110, the controller 115 can detect the computer worm based on an anomalous behavior of the computer worm, as is described in more fully herein.

In another embodiment, the gateway 125 selectively prevents normal network traffic (e.g., network traffic not generated by a computer worm) from propagating from the communication network 130 to the computer network 110 to prevent various anomalies or perturbations in the computer network 110. In this way, the orchestrated behavior of the computer network 110 can be simplified to increase the reliability of the computer worm sensor 105.

For example, the gateway 125 can prevent Internet Protocol (IP) data packets from being routed from the communication network 130 to the computer network 110. Alternatively, the gateway 125 can prevent broadcast and multicast network communications from being transmitted from the communication network 130 to the computer network 110, prevent communications generated by remote shell applications (e.g., Telnet) in the communication network 130 from propagating to the computer network 110, or exclude various application level gateways including proxy services that are typically present in a computer network for application programs in the computer network. Such application programs can include a Web browser, an FTP server and a mail server, and the proxy services can include the Hypertext Markup Language (HTML), the File Transfer Protocol (FTP), or the Simple Mail Transfer Protocol (SMTP).

In another embodiment, the computing systems 120 and the gateway 125 are virtual computing systems. For example, the computing systems 120 may be implemented as virtual systems using machine virtualization technologies such as VMware™ sold by VMware, Inc. In another example, the VM can be based on instrumental virtual CPU technology (e.g., Bochs, Qemu, and Valgrind.) In another embodiment, the virtual systems include VM software profiles and the controller 115 automatically updates the VM software profiles to be representative of the communication network 130. The gateway 125 and the computer network 110 may also be implemented as a combination of virtual and real systems.

In another embodiment, the computer network 110 is a virtual computer network. The computer network 110 includes network device drivers (e.g., special purpose network device drivers) that do not access a physical network, but instead use software message passing between the different virtual computing systems 120 in the computer network 110. The network device drivers may log data packets of network communications in the computer network 110, which represent the monitored behavior of the computer network 110.

In various embodiments, the computer worm sensor 105 establishes a software environment of the computer network 110 (e.g., computer programs in the computing systems 120) to reflect a software environment of a selected computer network (e.g., the communication network 130). For example, the computer worm sensor 105 can select a software environment of a computer network typically attacked by computer worms (e.g., a software environment of a commercial communication network) and can configure the computer network 110 to reflect that software environment. In a further embodiment, the computer worm sensor 105 updates the software environment of the computer network 110 to reflect changes in the software environment of the selected computer network. In this way, the computer worm sensor 105 can effectively detect a computer worm that targets a recently deployed software program or software profile in the software environment (e.g., a widely deployed software profile).

The computer worm sensor 105 can also monitor the software environment of the selected computer network and automatically update the software environment of the computer network 110 to reflect the software environment of the selected computer network. For example, the computer worm sensor 105 can modify the software environment of the computer network 110 in response to receiving an update for a software program (e.g., a widely used software program) in the software environment of the selected computer network.

In another embodiment, the computer worm sensor 105 has a probe mechanism to automatically check the version, the release number, and the patch-level of major operating systems and application software components installed in the communication network 130. Additionally, the computer worm sensor 105 has access to a central repository of up-to-date versions of the system and application software components. In this embodiment, the computer worm sensor 105 detects a widely used software component (e.g., software program) operating in the communication network 130, downloads the software component from the central repository, and automatically deploys the software component in the computer network 110 (e.g., installs the software component in the computing systems 120). The computer worm sensor 105 may coordinate with other computer worm sensors 105 to deploy the software component in the computer networks 110 of the computer worm sensors 105. In this way, the software environment of each computer worm sensor 105 is modified to contain the software component.

In another embodiment, the computer worm sensors 105 are automatically updated from a central computing system (e.g., a computing server) by using a push model. In this embodiment, the central computing system obtains updated software components and sends the updated software components to the computer worm sensors 105. Moreover, the software environments of the computer worm sensors 105 can represent widely deployed software that computer worms are likely to target. Examples of available commercial technologies that can aid in the automated update of software and software patches in a networked environment include N1 products sold by SUN Microsystems, Inc.™ and Adaptive Infrastructure products sold by the Hewlett Packard Company™. In some embodiments, the computer worm sensors 105 are authomatically updated by connecting to an independent software vendor (ISV) supplied update mechanism (e.g., the Microsoft Windows™ update service.)

The computer worm sensor 105, in some embodiments, can maintain an original image of the computer network 110 (e.g., a copy of the original file system for each computing system 120) in a virtual machine that is isolated from both of the computer network 110 and the communication network 130 (e.g., not connected to the computer network 110 or the communication network 130). The computer worm sensor 105 obtains a current image of an infected computing system 120 (e.g., a copy of the current file system of the computing system 120) and compares the current image with the original image of the computer network 110 to identify any discrepancies between these images, which represent an anomalous behavior of a computer worm in the infected computing system 120.

The computer worm sensor 105 generates a recovery script based on the discrepancies between the current image and the original image of the computing system 120. The recovery script can be used to disable the computer worm in the infected computing system 120 and repair damage to the infected computing system 120 caused by the computer worm. For example, the recovery script may include computer program code for identifying infected software programs or memory locations based on the discrepancies, and for removing the discrepancies from the infected software programs or memory locations. The infected computing system 120 can then execute the recovery script to disable (e.g., destroy) the computer worm and repair any damage to the infected computing system 120 caused by the computer worm.

The recovery script may include computer program code for replacing the current file system of the computing system 120 with the original file system of the computing system 120 in the original image of the computer network 110. Alternatively, the recovery script may include computer program code for replacing infected files with the corresponding original files of the computing system 120 in the original image of the computer network 110. In still another embodiment, the computer worm sensor 105 includes a file integrity checking mechanism (e.g., a tripwire) for identifying infected files in the current file system of the computing system 120. The recovery script can also include computer program code for identifying and restoring files modified by a computer worm to reactivate the computer worm during reboot of the computing system 120 (e.g., reactivate the computer worm after the computer worm is disabled).

In one embodiment, the computer worm sensor 105 occupies a predetermined address space (e.g., an unused address space) in the communication network 130. The communication network 130 redirects those network communications directed to the predetermined address space to the computer worm sensor 105. For example, the communication network 130 can redirect network communications to the computer worm sensor 105 by using various IP layer redirection techniques. In this way, an active computer worm using a random IP address scanning technique (e.g., a scan directed computer worm) can randomly select an address in the predetermined address space and can infect the computer worm sensor 105 based on the selected address (e.g., transmitting a network communication containing the computer worm to the selected address).

An active computer worm can select an address in the predetermined address space based on a previously generated list of target addresses (e.g., a hit-list directed computer worm) and can infect a computing system 120 located at the selected address. Alternatively, an active computer worm can identify a target computing system 120 located at the selected address in the predetermined address space based on a previously generated list of target systems, and then infect the target computing system 120 based on the selected address.

In various embodiments, the computer worm sensor 105 identifies data packets directed to the predetermined address space and redirects the data packets to the computer worm sensor 105 by performing network address translation (NAT) on the data packets. For example, the computer network 110 may perform dynamic NAT on the data packets based on one or more NAT tables to redirect data packets to one or more computing systems 120 in the computer network 110. In the case of a hit-list directed computer worm having a hit-list that does not have a network address of a computing system 120 in the computer network 110, the computer network 110 can perform NAT to redirect the hit-list directed computer worm to one of the computing systems 120. Further, if the computer worm sensor 105 initiates a network communication that is not defined by the orchestrated behavior of the computer network 110, the computer network 110 can dynamically redirect the data packets of the network communication to a computing system 120 in the computer network 110.

In another embodiment, the computer worm sensor 105 operates in conjunction with dynamic host configuration protocol (DHCP) servers in the communication network 130 to occupy an address space in the communication network 130. In this embodiment, the computer worm sensor 105 communicates with each DHCP server to determine which IP addresses are unassigned to a particular subnet associated with the DHCP server in the communication network 130. The computer worm sensor 105 then dynamically responds to network communications directed to those unassigned IP addresses. For example, the computer worm sensor 105 can dynamically generate an address resolution protocol (ARP) response to an ARP request.

In another embodiment, a traffic analysis device 135 analyzes communication traffic in the communication network 130 to identify a sequence of network communications characteristic of a computer worm. The traffic analysis device 135 may use one or more well-known worm traffic analysis techniques to identify a sequence of network communications in the communication network 130 characteristic of a computer worm. For example, the traffic analysis device 135 may identify a repeating pattern of network communications based on the destination ports of data packets in the communication network 130. The traffic analysis device 135 duplicates one or more network communications in the sequence of network communications and provides the duplicated network communications to the controller 115, which emulates the duplicated network communications in the computer network 110.

The traffic analysis device 135 may identify a sequence of network communications in the communication network 130 characteristic of a computer worm by using heuristic analysis techniques (i.e., heuristics) known to those skilled in the art. For example, the traffic analysis device 135 may detect a number of IP address scans, or a number of network communications to an invalid IP address, occurring within a predetermined period. The traffic analysis device 135 determines whether the sequence of network communications is characteristic of a computer worm by comparing the number of IP address scans or the number of network communications in the sequence to a heuristics threshold (e.g., one thousand IP address scans per second).

The traffic analysis device 135 may lower typical heuristics thresholds of these heuristic techniques to increase the rate of computer worm detection, which can also increase the rate of false positive computer worm detection by the traffic analysis device 135. Because the computer worm sensor 105 emulates the duplicated network communications in the computer network 110 to determine whether the network communications include an anomalous behavior of a computer worm, the computer worm sensor 105 may increase the rate of computer worm detection without increasing the rate of false positive worm detection.

In another embodiment, the traffic analysis device 135 filters network communications characteristic of a computer worm in the communication network 130 before providing duplicate network communications to the controller 115. For example, a host A in the communication network 130 can send a network communication including an unusual data byte sequence (e.g., worm code) to a TCP/UDP port of a host B in the communication network 130. In turn, the host B can send a network communication including a similar unusual data byte sequence to the same TCP/UDP port of a host C in the communication network 130. In this example, the network communications from host A to host B and from host B to host C represent a repeating pattern of network communication. The unusual data byte sequences may be identical data byte sequences or highly correlated data byte sequences. The traffic analysis device 135 filters the repeating pattern of network communications by using a correlation threshold to determine whether to duplicate the network communication and provide the duplicated network communication to the controller 115.

The traffic analysis device 135 may analyze communication traffic in the communication network 130 for a predetermined period. For example, the predetermined period can be a number of seconds, minutes, hours, or days. In this way, the traffic analysis device 135 can detect slow propagating computer worms as well as fast propagating computer worms in the communication network 130.

The computer worm sensor 105 may contain a computer worm (e.g., a scanning computer worm) within the computer network 110 by performing dynamic NAT on an unexpected network communication originating in the computer network 110 (e.g., an unexpected communication generated by a computing system 120). For example, the computer worm sensor 105 can perform dynamic NAT on data packets of an IP address range scan originating in the computer network 110 to redirect the data packets to a computing system 120 in the computer network 110. In this way, the network communication is contained in the computer network 110.

In another embodiment, the computer worm sensor 105 is topologically knit into the communication network 130 to facilitate detection of a topologically directed computer worm. The controller 115 may use various network services in the communication network 130 to topologically knit the computer worm sensor 105 into the communication network 130. For example, the controller 115 may generate a gratuitous ARP response including the IP address of a computing system 120 to the communication network 130 such that a host in the communication network 130 stores the IP address in an ARP cache. In this way, the controller 115 plants the IP address of the computing system 120 into the communication network 130 to topologically knit the computing system 120 into the communication network 130.

The ARP response generated by the computer worm sensor 105 may include a media access control (MAC) address and a corresponding IP address for one or more of the computing systems 120. A host (e.g., a computing system) in the communication network 130 can then store the MAC and IP addresses in one or more local ARP caches. A topologically directed computer worm can then access the MAC and IP addresses in the ARP caches and can target the computing systems 120 based on the MAC or IP addresses.

In various embodiments, the computer worm sensor 105 can accelerate network activities in the computer network 110. In this way, the computer worm sensor 105 can reduce the time for detecting a time-delayed computer worm (e.g., the CodeRed-II computer worm) in the computer network 110. Further, accelerating the network activities in the computer network 110 may allow the computer worm sensor 105 to detect the time-delayed computer worm before the time-delayed computer worm causes damage in the communication network 130. The computer worm sensor 105 can then generate a recovery script for the computer worm and provide the recovery script to the communication network 130 for disabling the computer worm in the communication network 130.

The computing system 120 in the computer network can accelerate network activities by intercepting time-sensitive system calls (e.g., "time-of-day" or "sleep" system calls) generated by a software program executing in the computing system 120 or responses to such systems calls, and then modifying the systems calls or responses to accelerate execution of the software program. For example, the computing system 120 can modify a parameter of a "sleep" system call to reduce the execution time of this system call or modify the time or date in a response to a "time-of-day" system call to a future time or date. Alternatively, the computing system 120 can identify a time consuming program loop (e.g., a long, central processing unit intensive while loop) executing in the computing system 120 and can increase the priority of the software program containing the program loop to accelerate execution of the program loop.

In various embodiments, the computer worm sensor 105 includes one or more computer programs for identifying execution anomalies in the computing systems 120 (e.g., anomalous behavior in the computer network 110) and distinguishing a propagation vector of a computer worm from spurious traffic (e.g. chaff traffic) generated by the computer worm. In one embodiment, the computing systems 120 execute the computing programs to identify execution anomalies occurring in the computing network 110. The computer worm sensor 105 correlates these execution anomalies with the monitored behavior of the computer worm to distinguish computing processes (e.g., network services) that the computer worm exploits for propagation purposes from computing processes that only receive benign network traffic from the computer worm. The computer worm sensor 105 then determines a propagation vector of the computer worm based on the computing processes that the computer worm propagates for exploitative purposes. In a further embodiment, each computing system 120 executing a function of one of the computer programs as an intrusion detection system (IDS) by generating a computer worm intrusion indicator in response to detecting an execution anomaly.

In one embodiment, the computer worm sensor 105 tracks system call sequences to identify an execution anomaly in the computing system 120. For example, the computer worm sensor 105 can use finite state automata techniques to identify an execution anomaly. Additionally, the computer worm system 105 may identify an execution anomaly based on call-stack information for system calls executed in a computing system 120. For example, a call-stack execution anomaly may occur when a computer worm executes system calls from the stack or the heap of the computing system 120. The computer worm system 105 may also identify an execution anomaly based on virtual path identifiers in the call-stack information.

The computer worm system 105 may monitor transport level ports of a computing system 120. For example, the computer worm sensor 105 can monitor systems calls (e.g., "bind" or "recvfrom" system calls) associated with one or more transport level ports of a computing process in the computing system 120 to identify an execution anomaly. If the computer worm system 105 identifies an execution anomaly for one of the transport level ports, the computer worm sensor 105 includes the transport level port in the identifier (e.g., a signature or a vector) of the computer worm, as is described more fully herein.

In another embodiment, the computer worm sensor 105 analyzes binary code (e.g., object code) of a computing process in the computing system 120 to identify an execution anomaly. The computer worm system 105 may also analyze the call stack and the execution stack of the computing system 120 to identify the execution anomaly. For example, the computer worm sensor 105 may perform a static analysis on the binary code of the computing process to identify possible call stacks and virtual path identifiers for the computing process. The computer worm sensor 105 then compares an actual call stack with the identified call stacks to identify a call stack execution anomaly in the computing system 120. In this way, the computer worm sensor 105 can reduce the number of false positive computer worm detections and false negative computer worm detections. Moreover, if the computer worm sensor 105 can identify all possible call-stacks and virtual path identifiers for the computing process, the computer worm sensor 105 can have a zero false positive rate of computer worm detection.

In another embodiment, the computer worm sensor 105 identifies one or more anomalous program counters in the call stack. For example, an anomalous program counter can be the program counter of a system call generated by worm code of a computer worm. The computer worm sensor 105 tracks the anomalous program counters and determines an identifier for detecting the computer worm based on the anomalous program counters. Additionally, the computer worm sensor 105 can determine whether a memory location (e.g., a memory address or a memory page) referenced by the program counter is a writable memory location. The computer worm sensor 105 then determines whether the computer worm has exploited the memory location. For example, a computer worm can store worm code into a memory location by exploiting a vulnerability of the computing system 120 (e.g., a buffer overflow mechanism).

The computer worm sensor 105 may take a snapshot of data in the memory around the memory location referenced by the anomalous program counter. The computer worm sensor 105 then searches the snapshot for data in recent data packets received by the computing process (e.g., computing thread) associated with the anomalous program counter. The computer worm sensor 105 searches the snapshot by using a searching algorithm to compare data in the recent data packets with a sliding window of data (e.g., 16 bytes of data) in the snapshot. If the computer worm sensor 105 finds a match between the data in a recent data packet and the data in the sliding window, the matching data is deemed to be a signature candidate for the computer worm.

In another embodiment, the computing system 120 tracks the integrity of computing code in a computing system 120 to identify an execution anomaly in the computing system 120. The computing system 120 associates an integrity value with data stored in the computing system 120 to identify the source of the data. If the data is from a known source (e.g., a computing program) in the computing system 120, the integrity value is set to one, otherwise the integrity value is set to zero. For example, data received by the computing system 120 in a network communication is associated with an integrity value of zero. The computing system 120 stores the integrity value along with the data in the computing system 120, and monitors a program counter in the computing system 120 to identify an execution anomaly based on the integrity value. A program counter having an integrity value of zero indicates that data from a network communication is stored in the program counter, which represents an execution anomaly in the computing system 120.

The computing system 120 may use the signature extraction algorithm to identify a decryption routine in the worm code of a polymorphic worm, such that the decryption routine is deemed to be a signature candidate of the computer worm. Additionally, the computer worm sensor 105 may compare signature candidates identified by the computing systems 120 in the computer worm sensor 105 to determine an identifier for detecting the computer worm. For example, the computer worm sensor 105 can identify common code portions in the signature candidates to determine an identifier for detecting the computer worm. In this way, the computer worm sensor 105 can determine an identifier of a polymorphic worm containing a mutating decryption routine (e.g., polymorphic code).

In another embodiment, the computer worm sensor 105 monitors network traffic in the computer network 110 and compares the monitored network traffic with typical network traffic patterns occurring in a computer network to identify anomalous network traffic in the computer network 110. The computer worm sensor 105 determines signature candidates based on data packets of the anomalous network traffic (e.g., extracts signature candidates from the data packets) and determines identifiers for detecting computer worms based on the signature candidates.

In another embodiment, the computer worm sensor 105 evaluates characteristics of a signature candidate to determine the quality of the signature candidate, which indicates an expected level of false positive computer worm detection in a computer network (e.g., the communication network 130). For example, a signature candidate having a high quality is not contained in data packets of typical network traffic occurring in the computer network. Characteristics of a signature candidate include a minimum length of the signature candidate (e.g., 16 bytes of data) and an unusual data byte sequence. In one embodiment, the computer worm sensor 105 performs statistical analysis on the signature candidate to determine whether the signature candidate includes an unusual byte sequence. For example, computer worm sensor 105 can determine a correlation between the signature candidate and data contained in typical network traffic. In this example, a low correlation (e.g., zero correlation) indicates a high quality signature candidate.

In another embodiment, the computer worm sensor 105 identifies execution anomalies by detecting unexpected computing processes in the computer network 110 (i.e., computing processes that are not part of the orchestrated behavior of the computing network 110). The operating systems in the computing systems 120 may be configured to detect computing processes that are not in a predetermined collection of computing processes. In another embodiment, a computing system 120 is configured as a network server that permits a host in the communication network 130 to remotely execute commands on the computing system 120. For example, the original Morris computer worm exploited a debug mode of sendmail that allowed remote command execution in a mail server.

In some cases, the intrusion detection system of the computer worm sensor 105 detects an active computer worm based on anomalous network traffic in the computer network 110, but the computer worm sensor 105 does not detect an execution anomaly caused by a computing process in the computer network 110. In these cases, the computer worm sensor 105 determines whether the computer worm has multiple possible transport vectors based on the ports being accessed by the anomalous network traffic in the computer network 110. If the computer network 110 includes a small number of ports (e.g., one or two), the computer worm sensor 105 can use these ports to determine a vector for the computer worm. Conversely, if the computer network 110 includes many ports (e.g., three or more ports), the computer worm sensor 105 partitions the computing services in the computer network 110 at appropriate control points to determine those ports exploited by the computer worm.

The computer worm sensor 105 may randomly block ports of the computing systems 120 to suppress traffic to these blocked ports. Consequently, a computer worm having a transport vector that requires one or more of the blocked ports will not be able to infect a computing system 120 in which those ports are blocked. The computer worm sensor 105 then correlates the anomalous behavior of the computer worm across the computing systems 120 to determine which ports the computer worm has used for diversionary purposes (e.g., emitting chaff) and which ports the computer worm has used for exploitive purposes. The computer worm sensor 105 then determines a transport vector of the computer worm based on the ports that the computer worm has used for exploitive purposes.

Figure 2:
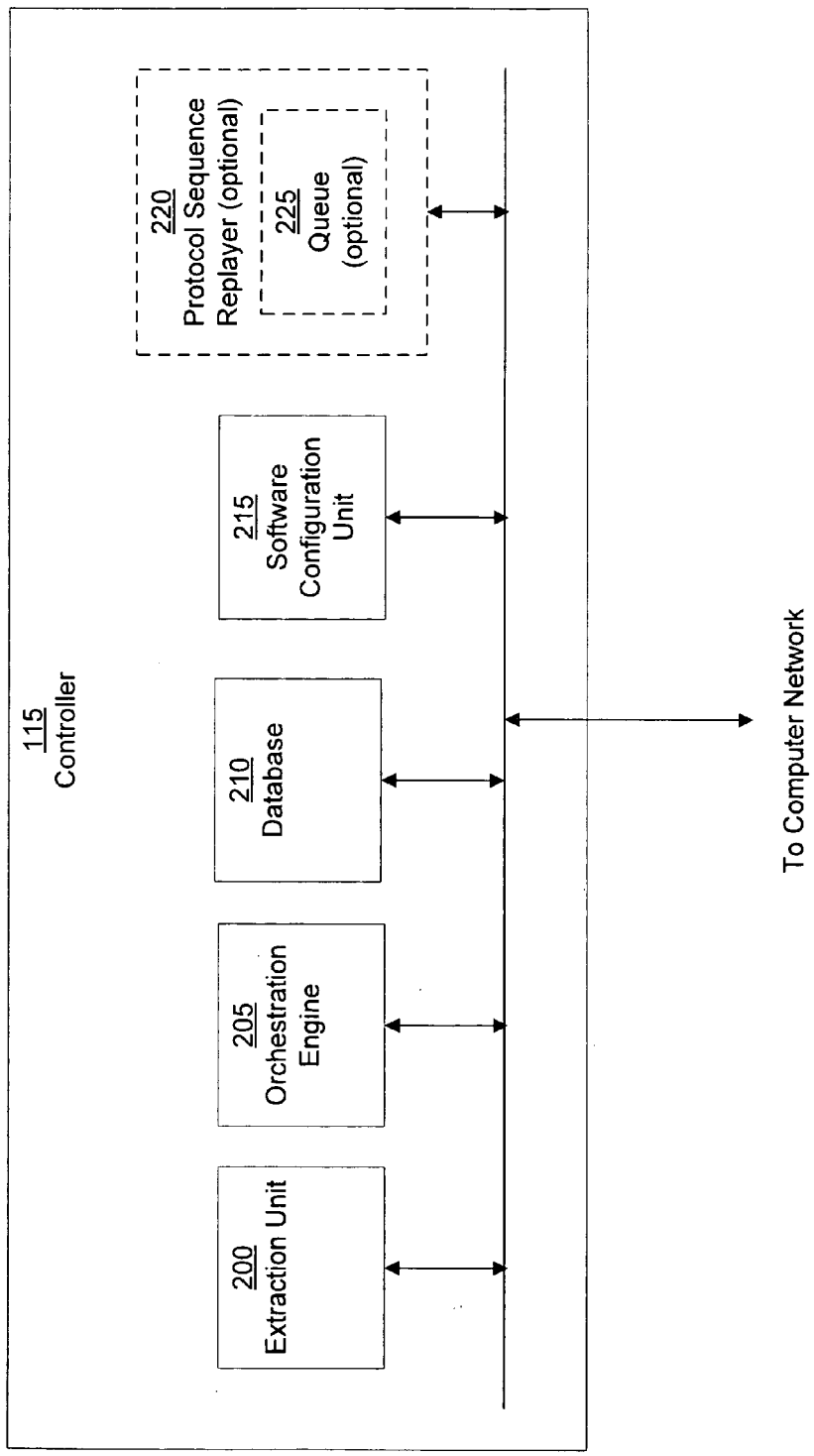
FIG. 2 depicts a controller of a computer worm sensor, in accordance with one embodiment of the present invention.

FIG. 2 depicts an exemplary embodiment of the controller 115. The controller 115 includes an extraction unit 200, an orchestration engine 205, a database 210, and a software configuration unit 215. The extraction unit 200, the orchestration engine 205, the database 210, and the software configuration unit 215 are in communication with each other and with the computer network 110 (FIG. 1). Optionally, the controller 115 includes a protocol sequence replayer 220 in communication with the computer network 110 and the traffic analysis device 135 (FIG. 1).

In various embodiments, the orchestration engine 205 controls the state and operation of the computer worm sensor 105 (FIG. 1). In one embodiment, the orchestration engine 205 configures the computing systems 120 (FIG. 1) and the gateway 125 (FIG. 1) to operate in a predetermined manner in response to network activities occurring in the computer network 110, and generates network activities in the computer network 110 and the communication network 130 (FIG. 1). In this way, the orchestration engine 205 orchestrates network activities in the computer network 110. For example, the orchestration engine 205 may orchestrate network activities in the computer network 110 by generating an orchestration sequence (e.g., a predetermined sequence of network activities) among various computing systems 120 in the computer network 110, including network traffic that typically occurs in the communication network 130.

In one embodiment, the orchestration engine 205 sends orchestration requests (e.g., orchestration patterns) to various orchestration agents (e.g., computing processes) in the computing systems 120. The orchestration agent of a computing system 120 performs a periodic sweep of computing services (e.g., network services) in the computing system 120 that are potential targets of a computer worm attack. The computing services in the computing system 120 may includes typical network services (e.g., web service, FTP service, mail service, instant messaging, or Kazaa) that are also in the communication network 130.

The orchestration engine 205 may generate a wide variety of orchestration sequences to exercise a variety of computing services in the computer network 110, or may select orchestration patterns to avoid loading the communication network 110 with orchestrated network traffic. Additionally, the orchestration engine 205 may select the orchestration patters to vary the orchestration sequences. In this way, a computer worm is prevented from scanning the computer network 110 to predict the behavior of the computer network 110.

In various embodiments, the software configuration unit 215 dynamically creates or destroys virtual machines (VMs) or VM software profiles in the computer network 110, and may initialize or update the software state of the VMs or VM software profiles. In this way, the software configuration unit 215 configures the computer network 110 such that the controller 115 can orchestrate network activities in the computer network 110 based on one or more orchestration patterns. It is to be appreciated that the software configuration unit 215 is optional in various embodiments of the computer worm sensor 105.

In various embodiments, the extraction unit 200 determines an identifier for detecting the computer worm. In these embodiments, the extraction unit 200 can extract a signature or a vector of the computer worm based on network activities (e.g., an anomalous behavior) occurring in the computer network 110, for example from data (e.g., data packets) in a network communication.

The database 210 stores data for the computer worm sensor 105, which may include a configuration state of the computer worm sensor 105. For example, the configuration state may include orchestration patterns or "golden" software images of computer programs (i.e., original software images uncorrupted by a computer worm exploit). The data stored in the database 210 may also includes identifiers or recovery scripts for computer worms, or identifiers for the sources of computer worms in the communication network 130. The identifier for the source of each computer worm may be associated with the identifier and the recovery script of the computer worm.

The protocol sequence replayer 220 receives a network communication from the traffic analysis device 135 (FIG. 1) representing a network communication in the communication network 130 and replays (i.e., duplicates) the network communication in the computer network 110. The protocol sequence replayer 220 may receive the network communication from the traffic analysis device 135 via a private encrypted network (e.g., a virtual private network) within the communication network 130 or via another communication network. The controller 115 monitors the behavior of the computer network 110 in response to the network communication to determine a monitored behavior of the computer network 110 and determine whether the monitored behavior includes an anomalous behavior, as is described more fully herein.

In one embodiment, the protocol sequence replayer 220 includes a queue 225 for storing network communications. The queue 225 receives a network communication from the traffic analysis device 135 and temporarily stores the network communication until the protocol sequence replayer 220 is available to replay the network communication. In another embodiment, the protocol sequence replayer 220 is a computing system 120 in the computer network 110. For example, the protocol sequence replayer 200 may be a computer server including computer program code for replaying network communications in the computer network 110.

In another embodiment, the protocol sequence replayer 220 is in communication with a port (e.g., connected to a network port) of a network device in the communication network 130 and receives duplicated network communications occurring in the communication network 130 from the port. For example, the port can be a Switched Port Analyzer (SPAN) port of a network switch or a network router in the communication network 130, which duplicates network traffic in the communication network 130. In this way, various types of active and passive computer worms (e.g., hit-list directed, topologically-directed, server-directed, and scan-directed computer worms) may propagate from the communication network 130 to the computer network 110 via the duplicated network traffic.

The protocol sequence replayer 220 replays the data packets in the computer network 110 by sending the data packets to a computing system 120 having the same class (e.g., Linux or Windows platform) as the original target system of the data packets. In various embodiments, the protocol network replayer 220 synchronizes any return network traffic generated by the computing system 120 in response to the data packets. The protocol sequence replayer 220 may suppress (e.g., discard) the return network traffic such that the return network traffic is not transmitted to a host in the communication network 130. In one embodiment, the protocol sequence replayer 220 replays the data packets by sending the data packets to the computing system 120 via a TCP connection or UDP session. In this embodiment, the protocol sequence replayer 220 synchronizes return network traffic by terminating the TCP connection or UDP session.

The protocol sequence replayer 220 may modify destination IP addresses of data packets in the network communication to one or more IP addresses of the computing systems 120 and replay (i.e., generate) the modified data packets in the computer network 110. The controller 115 monitors the behavior of the computer network 110 in response to the modified data packets, and may detect an anomalous behavior in the monitored behavior, as is described more fully herein. If the controller 115 identifies an anomalous behavior, the computer network 110 is deemed to be infected with a computer worm and the controller 115 determines an identifier for the computer worm, as is described more fully herein.

The protocol sequence replayer 220 may analyze data packets in a sequence of network communications in the communication network 130 to identify a session identifier. The session identifier identifies a communication session for the sequence of network communications and can distinguish the network communications in the sequence from other network communications in the communication network 130. For example, each communication session in the communication network 130 can have a unique session identifier. The protocol sequence replayer 220 may identify the session identifier based on the communication protocol of the network communications in the sequence. For instance, the session identifier may be in a field of a data packet header as specified by the communication protocol. Alternatively, the protocol sequence replayer 220 may infer the session identifier from repeating network communications in the sequence. For example, the session identifier is typically one of the first fields in an application level communication between a client and a server (e.g., computing system 120) and is repeatedly used in subsequent communications between the client and the server.

The protocol sequence replayer 220 may modify the session identifier in the data packets of the sequence of network communications. The protocol sequence replayer 220 generates an initial network communication in the computer network 110 based on a selected network communication in the sequence, and the computer network 110 (e.g., a computing system 120) generates a response including a session identifier. The protocol sequence replayer 220 then substitutes the session identifier in the remaining data packets of the network communication with the session identifier of the response. In a further embodiment, the protocol sequence replayer 220 dynamically modifies session variables in the data packets, as is appropriate, to emulate the sequence of network communications in the computer network 110.

The protocol sequence replayer 220 may determine the software or hardware profile of a host (e.g., a computing system) in the communication network 130 to which the data packets of the network communication are directed. The protocol sequence replayer 220 then selects a computing system 120 in the computer network 110 that has the same software or hardware profile of the host and performs dynamic NAT on the data packets to redirect the data packets to the selected computing system 120. Alternatively, the protocol sequence replayer 220 randomly selects a computing system 120 and performs dynamic NAT on the data packets to redirect the data packets to the randomly selected computing system 120.

In one embodiment, the traffic analysis device 135 can identify a request (i.e., a network communication) from a web browser to a web server in the communication network 130, and a response (i.e., a network communication) from the web server to the web browser. In this case, the response may include a passive computer worm. The traffic analysis device 135 may inspect web traffic on a selected network link in the communication network 130 to identify the request and response. For example, the traffic analysis device 135 may select the network link or identify the request based on a policy. The protocol sequence replayer 220 orchestrates the request in the computer network 110 such that a web browser in a computing system 120 initiates a substantially similar request. In response to this request, the protocol sequence replayer 220 generates a response to the web browser in the computing system 120, which is substantially similar to the response generated by the web server in the communication network 130. The controller 115 then monitors the behavior of the web browser in the computing system 120 and may identify an anomalous behavior in the monitored behavior. If the controller 115 identifies an anomalous behavior, the computer network 110 is deemed to be infected with a passive computer worm.

Figure 3:
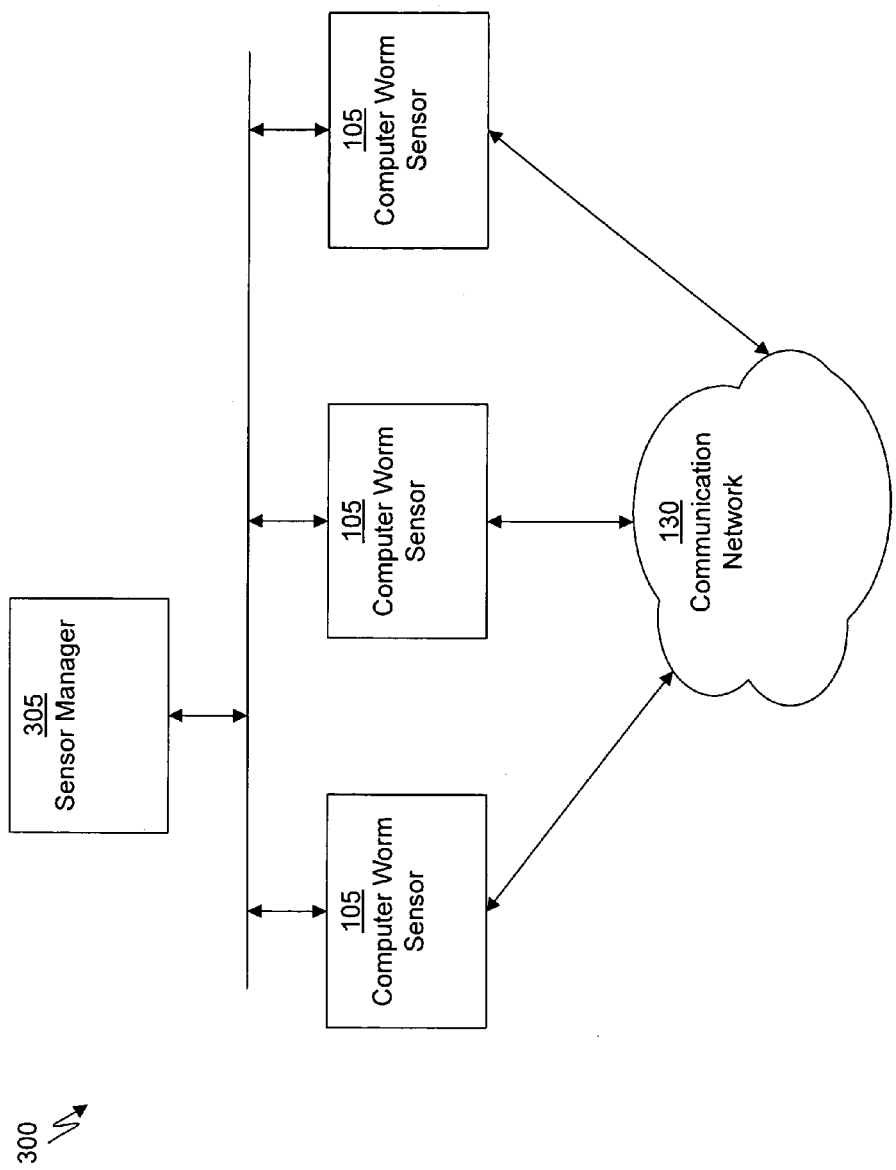
FIG. 3 depicts a computer worm detection system, in accordance with one embodiment of the present invention.

FIG. 3 depicts an exemplary computer worm detection system 300. The computer worm detection system 300 includes multiple computer worm sensors 105 and a sensor manager 305. Each of the computer worm sensors 130 is in communication with the sensor manager 305 and the communication network 130. The sensor manager 305 coordinates communications or operations between the computer worm sensors 105.

In one embodiment, each computer worm sensor 105 randomly blocks one or more ports of the computing systems 120. Accordingly, some of the worm sensors 105 may detect an anomalous behavior of a computer worm, as described more fully herein. The worm sensors 105 that detect an anomalous behavior communicate the anomalous behavior (e.g., a signature candidate) to the sensor manager 305. In turn, the sensor manager 305 correlates the anomalous behaviors and determines an identifier (e.g., a transport vector) for detecting the computer worm.

In some cases, a human intruder (e.g., a computer hacker) may attempt to exploit vulnerabilities that a computer worm would exploit in a computer worm sensor 105. The sensor manager 305 may distinguish an anomalous behavior of a human intruder from an anomalous behavior of a computer worm by tracking the number of computing systems 120 in the computer worm sensors 105 that detect a computer worm within a given period. If the number of computing systems 120 detecting a computer worm within the given period exceeds a predetermined threshold, the sensor manager 305 determines that a computer worm caused the anomalous behavior. Conversely, if the number of computing systems 120 detecting a computer worm within the given period is equal to or less than the predetermined threshold, the sensor manager 300 determines that a human intruder caused the anomalous behavior. In this way, false positive detections of the computer worm may be decreased.

In one embodiment, each computer worm sensor 105 maintains a list of infected hosts (e.g., computing systems infected by a computer worm) in the communication network 130 and communicates the list to the sensor manager 305. In this way, computer worm detection system 300 maintains a list of infected hosts detected by the computer worm sensors 105.

Figure 4:
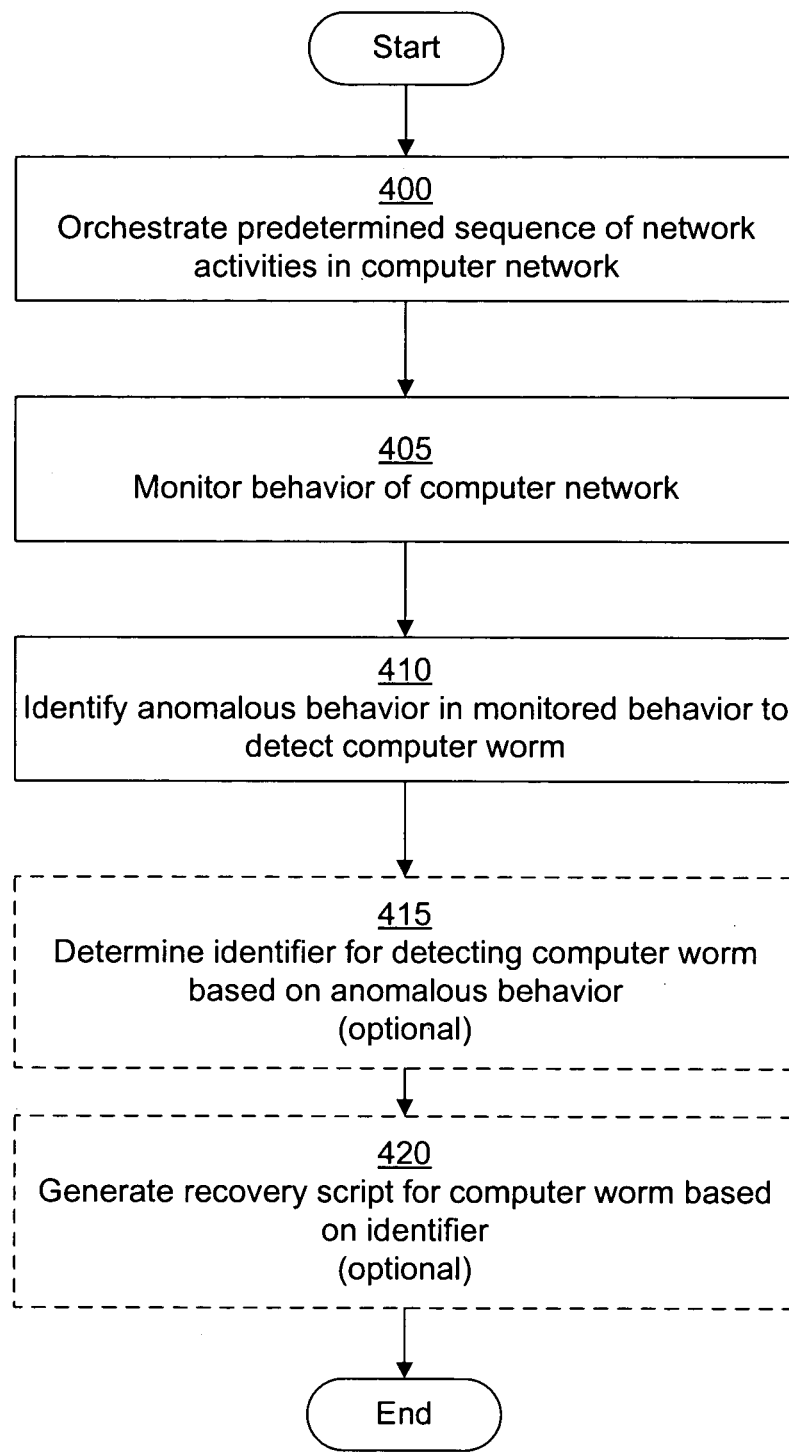
FIG. 4 depicts a flow chart for a method of detecting computer worms, in accordance with one embodiment of the present invention.

FIG. 4 depicts a flow chart for an exemplary method of detecting computer worms, in accordance with one embodiment of the present invention. In step 400, the computer worm sensor 105 (FIG. 1) orchestrates a sequence of network activities in the computer network 110 (FIG. 1). For example, the orchestration engine 205 (FIG. 2) of the computer worm sensor 105 can orchestrate the sequence of network activity in the computer network 110 based on one or more orchestration patterns, as is described more fully herein.

In step 405, the controller 115 (FIG. 1) of the computer worm sensor 105 monitors the behavior of the computer network 110 in response to the predetermined sequence of network activity. For example, the orchestration engine 205 (FIG. 2) of the computer worm sensor 105 can monitor the behavior of the computer network 110. The monitored behavior of the computer network 110 may include one or more network activities in addition to the predetermined sequence of network activities or network activities that differ from the predetermined sequence of network activities.

In step 410, the computer worm sensor 105 identifies an anomalous behavior in the monitored behavior to detect a computer worm. In one embodiment, the controller 115 identifies the anomalous behavior by comparing the predetermined sequence of network activities with network activities in the monitored behavior. For example, the orchestration engine 205 of the controller 115 can identify the anomalous behavior by comparing network activities in the monitored behavior with one or more orchestrated behaviors defining the predetermined sequence of network activities. The computer worm sensor 105 evaluates the anomalous behavior to determine whether the anomalous behavior is caused by a computer worm, as is described more fully herein.

In step 415, the computer worm sensor 105 determines an identifier for detecting the computer worm based on the anomalous behavior. The identifier may include a signature or a vector of the computer worm, or both. For example, the vector can be a transport vector, an attack vector, or a payload vector. In one embodiment, the extraction unit 200 of the computer worm sensor 105 determines the signature of the computer worm based on one or more signature candidates, as is described more fully herein. It is to be appreciated that step 415 is optional in accordance with various embodiments of the computer worm sensor 105.

In step 420, the computer worm sensor 105 generates a recovery script for the computer worm. An infected host (e.g., an infected computing system or network) can then execute the recovery script to disable (e.g., destroy) the computer worm in the infected host or repair damage to the host caused by the computer worm. The computer worm sensor 105 may also identify a host in the communication network 130 that is the source of the computer worm and provides the recovery script to the host such that the host can disable the computer worm and repair damage to the host caused by the computer worm.

In one embodiment, the controller 115 determines a current image of the file system in the computer network 120, and compares the current image with an original image of the file system in the computer network 120 to identify any discrepancies between the current image and the original image. The controller 115 then generates the recovery script based on these discrepancies. The recovery script includes computer program code for identifying infected software programs or memory locations based on the discrepancies, and removing the discrepancies from infected software programs or memory locations.

Figure 5:
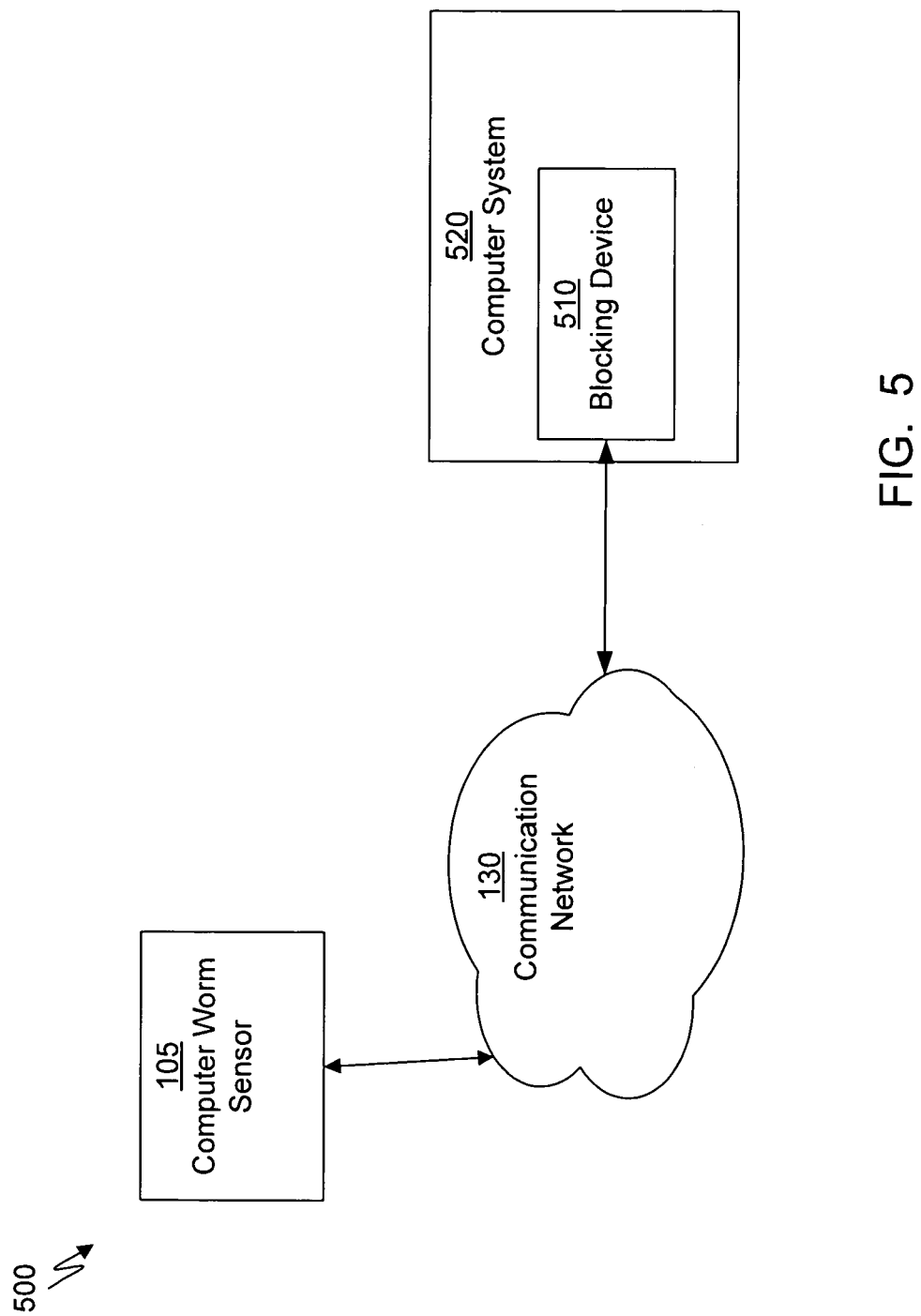
FIG. 5 depicts a computer worm containment system, in accordance with one embodiment of the present invention.

FIG. 5 depicts an exemplary embodiment of a computer worm containment system 500 comprising a worm sensor 105 in communication with a computer worm blocking system, shown here as a single blocking device 510, over a communication network 130. The blocking device 510 is configured to protect one or more computing services 520. Although the blocking device 510 is shown in FIG. 5 as integrated within the computing service 520, the blocking device 510 can also be implemented as a network appliance between the computing service 520 and the communication network 130. It will be appreciated that the blocking device 510 can also be in communication with more than one worm sensor 105 across the communication network 130. Further, although the communication network 130 is illustrated as being distinct from the computing service 520, the computing service 520 can also be a component of the communication network 130.

Additionally, the computer worm blocking system can comprise multiple blocking devices 510 in communication with one or more computer worm blocking managers (not shown) across the communication network 130 in analogous fashion to the computer worm detection system 300 of FIG. 3. The computer worm blocking managers coordinate communications and operations between the blocking devices 510. In general, worm sensors 105 and blocking devices 510 may be collocated, or they may be implemented on separate devices, depending on the network environment. In one embodiment, communications between the worm sensors 105, the sensor manager 305, the blocking devices 510, and the computer worm blocking managers are cryptographically authenticated.

In one embodiment, the blocking device 510 loads a computer worm signature into a content filter operating at the network level to block the computer worm from entering the computing service 520 from the communication network 130. In another embodiment, the blocking device 510 blocks a computer worm transportation vector in the computing service 520 by using transport level action control lists (ACLs) in the computing service 520.

More specifically, the blocking device 510 can function as a network interface between the communication network 130 and the corresponding computing service 520. For example, a blocking device 510 can be an inline signature based Intrusion Detection and Protection (IDP) system, as would be recognized by one skilled in the art. As another example, the blocking device 510 can be a firewall, network switch, or network router that includes content filtering or ACL management capabilities.

An effective computer worm quarantine may require a proper network architecture to ensure that blocking measures are effective in containing the computer worm. For example, if there are content filtering devices or transport level ACL devices protecting a set of subnets on the computing service 520, then there should not be another path from the computing service 520 on that subnet that does not pass through the filtering device.

Assuming that the communication network 130 is correctly partitioned, the function of the blocking device 510 is to receive a computer worm identifier, such as a signature list or transport vector, from the worm sensor 105 and configure the appropriate filtering devices. These filtering devices can be commercially available switches, routers, or firewalls obtainable from any of a number of network equipment vendors, or host-based solutions that provide similar functionality. In some embodiments, ACLs are used to perform universal blocking of those transport ports for the computing services 520 under protection. For example, traffic originating from a given source IP and intended for a given destination IP with the destination port matching a transport port in the transport vector can be blocked.

Another class of filtering is content based filtering, in which the filtering devices inspect the contents of the data past the TCP or UDP header of a data packet to check for particular data sequences. Examples of content filtering devices are routers in the class of the Cisco™ routers that use Network Based Application Recognition (NBAR) to classify and apply a policy to packets (e.g., reduce the priority of the packets or discard the packets). These types of filtering devices can be useful to implement content filtering at appropriate network points.

In one embodiment, host-based software is deployed on an enterprise scale to perform content filtering in the context of host-based software. In this embodiment, ACL specifications (e.g., vendor independent ACL specifications) and content filtering formats (e.g., eXtensible Markup Language or XML format) are communicated to the blocking devices 510, which in turn dynamically configure transport ACLs or content filters for network equipment and host software of different vendors.

Figure 6:
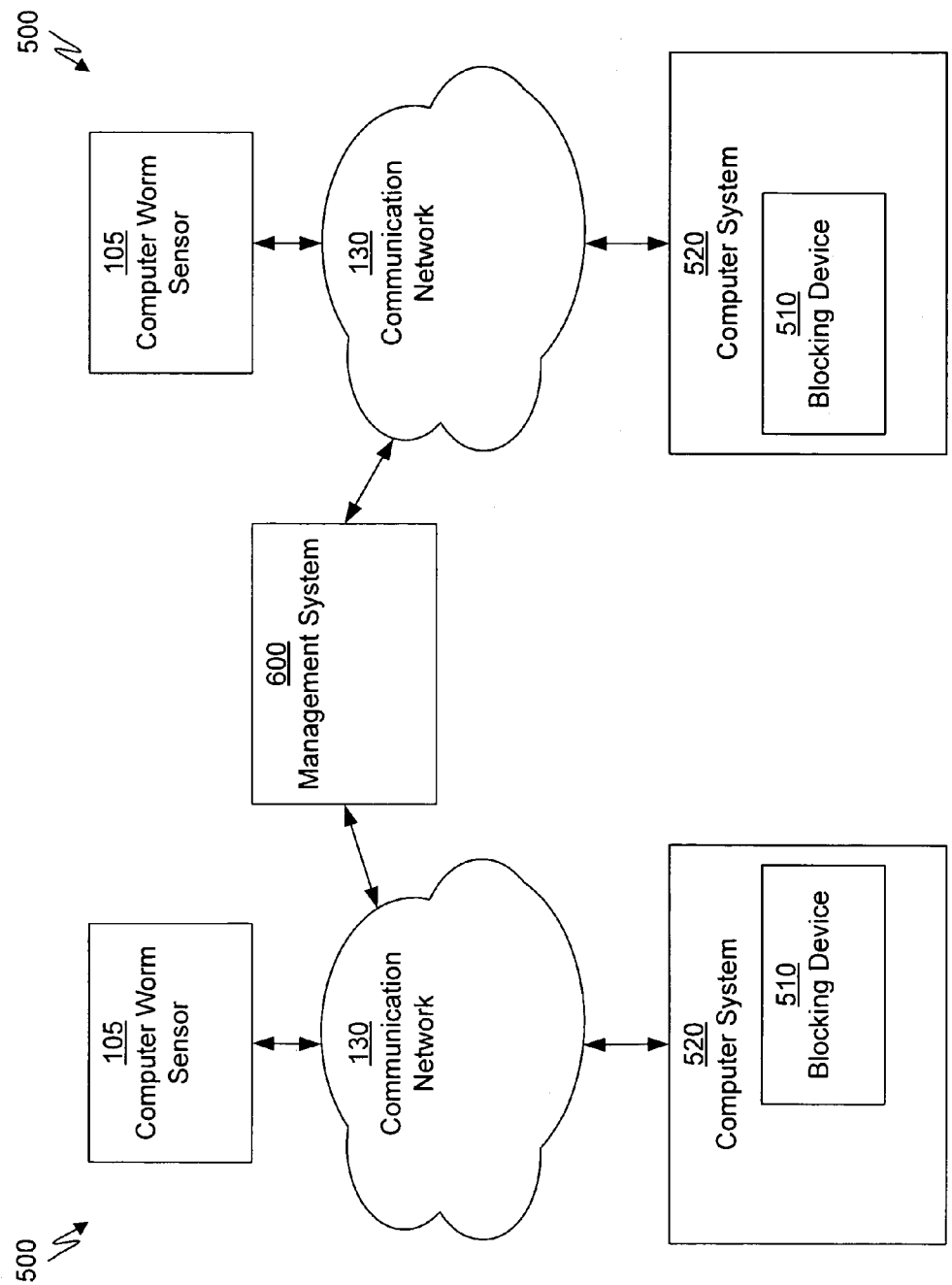
FIG. 6 depicts a computer worm defense system, in accordance with one embodiment of the present invention.

FIG. 6 depicts a computer worm defense system of the present invention that comprises a plurality of separate computer worm containment systems 500 coupled to a management system 600. Each of the plurality of computer worm containment systems 500 includes a worm sensor 105 in communication over a communication network 130 with a computer worm blocking system, again represented by a single blocking device 510 configured to protect a computer system 520. The management system 600 communicates with both the worm sensors 105 and the blocking systems of the various computer worm containment systems 500.

Each computer worm containment system 500 is associated with a subscriber having a subscriber account that is maintained and managed by the management system 600. The management system 600 provides various computer worm defense services that allow the subscribers to obtain different levels of protection from computer worms, computer viruses, and other malicious code, based on levels of payment, for example.

The management system 600 interacts with the worm sensors 105 of the various computer worm containment systems in several ways. For example, the management system 600 can activate and deactivate worm sensors 105 based on payment or the lack thereof by the associated subscriber. The management system 600 also obtains identifiers of computer worms and repair scripts from the various worm sensors 105 and distributes these identifiers to other computer worm containment systems 500. The management system 600 can also distribute system updates as needed to controllers 115 (not shown) of the worm sensors 105. It will be appreciated that the computer worm defense system of the invention benefits from having a distributed set of worm sensors 105 in a widely distributed set of environments, compared to a centralized detection system, because computer worms are more likely to be detected sooner by the distributed set of worm sensors 105.

Accordingly, in some embodiments it is advantageous to not deactivate a worm sensor 500 upon non-payment by a subscriber.

The management system 600 also interacts with the computer worm blocking systems of the various computer worm containment systems. Primarily, the management system 600 distributes computer worm identifiers found by worm sensors 105 of other computer worm containment systems 500 to the remaining computer worm blocking systems. In some embodiments the distribution is performed automatically as soon as the identifiers become known to the management system 600. However, in other embodiments, perhaps based on lower subscription rates paid by subscribers, newly found computer worm identifiers are distributed on a periodic basis such as daily or weekly. Similarly, the distribution of repair scripts to the various computer worm containment systems can also be controlled by the management system 600. In some embodiments, identifiers and/or repair scripts are distributed to subscribers by CD-ROM or similar media rather than automatically over a network such as the Internet.

In one embodiment, payment for the computer worm defense service is based on a periodic (e.g., monthly or annual) subscription fee. Such a fee can be based on the size of the enterprise being protected by the subscriber's computer worm containment system 500, where the size can be measured, for example, by the number of computer systems 520 therein. In another embodiment, a subscriber pays a fee for each computer worm identifier that is distributed to a computer worm containment system associated with the subscriber. In still another embodiment, payment for the computer worm defense service is based on a combination of a periodic subscription fee and a fee for each computer worm identifier received from the computer worm defense service. In yet another embodiment, subscribers receive a credit for each computer worm identifier that originates from a worm sensor 105 of their computer worm containment system 500.

Figure 7:
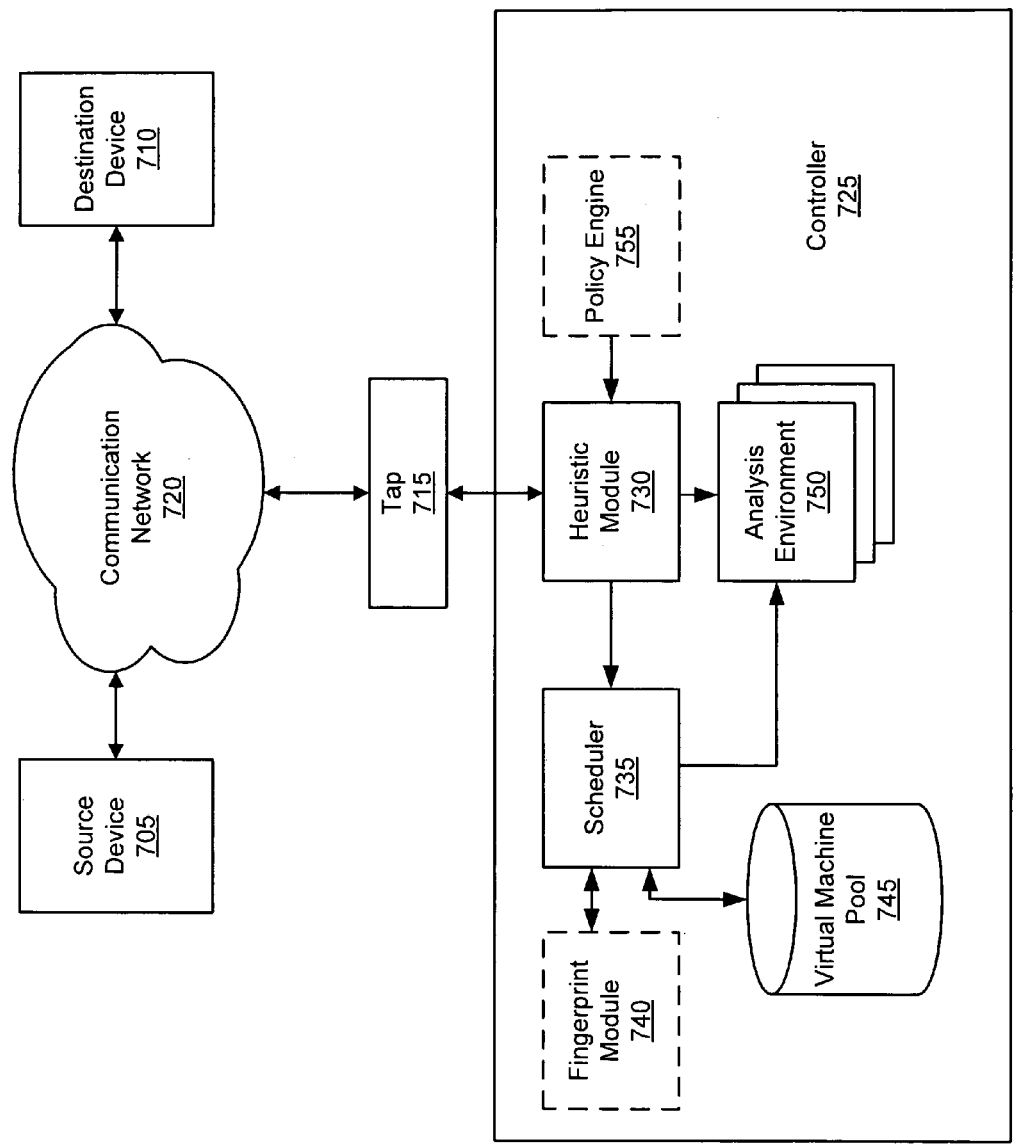
FIG. 7 depicts an unauthorized activity detection system, in accordance with one embodiment of the present invention.

FIG. 7 depicts an unauthorized activity detection system 700, in accordance with one embodiment of the present invention. The unauthorized activity detection system 700 comprises a source device 705, a destination device 710, and a tap 715 each coupled to a communication network 720. The tap 715 is further coupled to a controller 725.

The source device 705 and the destination device 710 are digital devices. Some examples of digital devices include computers, servers, laptops, personal digital assistants, and cellular telephones. The source device 705 is configured to transmit network data over the communication network 720 to the destination device 710. The destination device is configured to receive the network data from the source device 705.

The tap 715 is a digital data tap configured to monitor network data and provide a copy of the network data to the controller 725. Network data comprises signals and data that are transmitted over the communication network 720 including data flows from the source device 705 to the destination device 710. In one example, the tap 715 intercepts and copies the network data without an appreciable decline in performance of the source device 705, the destination device 710, or the communication network 720. The tap 715 can copy any portion of the network data. For example, the tap 715 can receive and copy any number of data packets from the network data.

In some embodiments, the network data can be organized into one or more data flows and provided to the controller 725. In various embodiments, the tap 715 can sample the network data based on a sampling scheme. Data flows can then be reconstructed based on the network data samples.

The tap 715 can also capture metadata from the network data. The metadata can be associated with the source device 705 and the destination device 710. The metadata can identify the source device 705 and/or the destination device 710. In some embodiments, the source device 705 transmits metadata which is capture by the tap 715. In other embodiments, the heuristic module 730 (described herein) can determine the source device 705 and the destination device 710 by analyzing data packets within the network data in order to generate the metadata.

The communication network 720 can be similar to the communication network 130 (FIG. 1). The communication network 720 can be a public computer network such as the Internet, or a private computer network such as a wireless telecommunication network, wide area network, or local area network.

The controller 725 can be any digital device or software that receives network data from the tap 715. In some embodiments, the controller 725 is contained within the computer worm sensor 105 (FIG. 1). In other embodiments, the controller 725 may be contained within a separate traffic analysis device 135 (FIG. 1) or a stand-alone digital device. The controller 725 can comprise a heuristic module 730, a scheduler 735, a fingerprint module 740, a virtual machine pool 745, an analysis environment 750, and a policy engine 755. In some embodiments, the tap 715 can be contained within the controller 725.

The heuristic module 730 receives the copy of the network data from the tap 715. The heuristic module 730 applies heuristics and/or probability analysis to determine if the network data might contain suspicious activity. In one example, the heuristic module 730 flags network data as suspicious. The network data can then be buffered and organized into a data flow. The data flow is then provided to the scheduler 735. In some embodiments, the network data is provided directly to the scheduler 735 without buffering or organizing the data flow.

The heuristic module 730 can perform any heuristic and/or probability analysis. In one example, the heuristic module 730 performs a dark internet protocol (IP) heuristic. A dark IP heuristic can flag network data coming from a source device 705 that has not previously been identified by the heuristic module 730. The dark IP heuristic can also flag network data going to an unassigned IP address. In an example, an attacker scans random IP addresses of a network to identify an active server or workstation. The dark IP heuristic can flag network data directed to an unassigned IP address.

The heuristic module 730 can also perform a dark port heuristic. A dark port heuristic can flag network data transmitted to an unassigned or unusual port address. Such network data transmitted to an unusual port can be indicative of a port scan by a worm or hacker. Further, the heuristic module 730 can flag network data from the source device 705 that are significantly different than traditional data traffic transmitted by the source device 705. For example, the heuristic module 730 can flag network data from a source device 705 such as a laptop that begins to transmit network data that is common to a server.

The heuristic module 730 can retain data packets belonging to a particular data flow previously copied by the tap 715. In one example, the heuristic module 730 receives data packets from the tap 715 and stores the data packets within a buffer or other memory. Once the heuristic module 730 receives a predetermined number of data packets from a particular data flow, the heuristic module 730 performs the heuristics and/or probability analysis.

In some embodiments, the heuristic module 730 performs heuristic and/or probability analysis on a set of data packets belonging to a data flow and then stores the data packets within a buffer or other memory. The heuristic module 730 can then continue to receive new data packets belonging to the same data flow. Once a predetermined number of new data packets belonging to the same data flow are received, the heuristic and/or probability analysis can be performed upon the combination of buffered and new data packets to determine a likelihood of suspicious activity.

In some embodiments, an optional buffer receives the flagged network data from the heuristic module 730. The buffer can buffer and organize the flagged network data into one or more data flows before providing the one or more data flows to the scheduler 735. In various embodiments, the buffer can buffer network data and stall before providing the network data to the scheduler 735. In one example, the buffer stalls the network data to allow other components of the controller 725 time to complete functions or otherwise clear data congestion.

The scheduler 735 identifies the destination device 710 and retrieves a virtual machine associated with the destination device 710. A virtual machine is software that is configured to mimic the performance of a device (e.g., the destination device 710). The virtual machine can be retrieved from the virtual machine pool 745.

In some embodiments, the heuristic module 730 transmits the metadata identifying the destination device 710 to the scheduler 735. In other embodiments, the scheduler 735 receives one or more data packets of the network data from the heuristic module 730 and analyzes the one or more data packets to identify the destination device 710. In yet other embodiments, the metadata can be received from the tap 715.

The scheduler 735 can retrieve and configure the virtual machine to mimic the pertinent performance characteristics of the destination device 710. In one example, the scheduler 735 configures the characteristics of the virtual machine to mimic only those features of the destination device 710 that are affected by the network data copied by the tap 715. The scheduler 735 can determine the features of the destination device 710 that are affected by the network data by receiving and analyzing the network data from the tap 715. Such features of the destination device 710 can include ports that are to receive the network data, select device drivers that are to respond to the network data and any other devices coupled to or contained within the destination device 710 that can respond to the network data. In other embodiments, the heuristic module 730 can determine the features of the destination device 710 that are affected by the network data by receiving and analyzing the network data from the tap 715. The heuristic module 730 can then transmit the features of the destination device to the scheduler 735.

The optional fingerprint module 740 is configured to determine the packet format of the network data to assist the scheduler 735 in the retrieval and/or configuration of the virtual machine. In one example, the fingerprint module 740 determines that the network data is based on a transmission control protocol/internet protocol (TCP/IP). Thereafter, the scheduler 735 will configure a virtual machine with the appropriate ports to receive TCP/IP packets. In another example, the fingerprint module 740 can configure a virtual machine with the appropriate ports to receive user datagram protocol/internet protocol (UDP/IP) packets. The fingerprint module 740 can determine any type of packet format of a network data.

In other embodiments, the optional fingerprint module 740 passively determines a software profile of the network data to assist the scheduler 735 in the retrieval and/or configuration of the virtual machine. The software profile may comprise the operating system (e.g., Linux RH6.2) of the source device 705 that generated the network data. The determination can be based on analysis of the protocol information of the network data. In an example, the optional fingerprint module 740 determines that the software profile of network data is Windows XP, SP1. The optional fingerprint module 740 can then configure a virtual machine with the appropriate ports and capabilities to receive the network data based on the software profile. In other examples, the optional fingerprint module 740 passes the software profile of the network data to the scheduler 735 which either selects or configures the virtual machine based on the profile.

The virtual machine pool 745 is configured to store virtual machines. The virtual machine pool 745 can be any storage capable of storing software. In one example, the virtual machine pool 745 stores a single virtual machine that can be configured by the scheduler 735 to mimic the performance of any destination device 710 on the communication network 720. The virtual machine pool 745 can store any number of distinct virtual machines that can be configured to simulate the performance of any destination devices 710.

The analysis environment 750 simulates transmission of the network data between the source device 705 and the destination device 710 to analyze the effects of the network data upon the destination device 710. The analysis environment 750 can identify the effects of malware or illegitimate computer users (e.g., a hacker, computer cracker, or other computer user) by analyzing the simulation of the effects of the network data upon the destination device 710 that is carried out on the virtual machine. There can be multiple analysis environments 710 to simulate multiple network data. The analysis environment 750 is further discussed with respect to FIG. 8.

The optional policy engine 755 is coupled to the heuristic module 730 and can identify network data as suspicious based upon policies contained within the policy engine 755. In one example, a destination device 710 can be a computer designed to attract hackers and/or worms (e.g., a "honey pot"). The policy engine 755 can contain a policy to flag any network data directed to the "honey pot" as suspicious since the "honey pot" should not be receiving any legitimate network data. In another example, the policy engine 755 can contain a policy to flag network data directed to any destination device 710 that contains highly sensitive or "mission critical" information.

The policy engine 755 can also dynamically apply a rule to copy all network data related to network data already flagged by the heuristic module 730. In one example, the heuristic module 730 flags a single packet of network data as suspicious. The policy engine 755 then applies a rule to flag all data related to the single packet (e.g., data flows) as suspicious. In some embodiments, the policy engine 755 flags network data related to suspicious network data until the analysis environment 750 determines that the network data flagged as suspicious is related to unauthorized activity.

Although FIG. 7 depicts data transmitted from the source device 705 to the destination device 710, either device can transmit and receive data from the other. Similarly, although only two devices are depicted, any number of devices can send and/or receive data across the communication network 720. Moreover, the tap 715 can monitor and copy data transmitted from multiple devices without appreciably effecting the performance of the communication network 720 or the devices coupled to the communication network 720.

Figure 8:
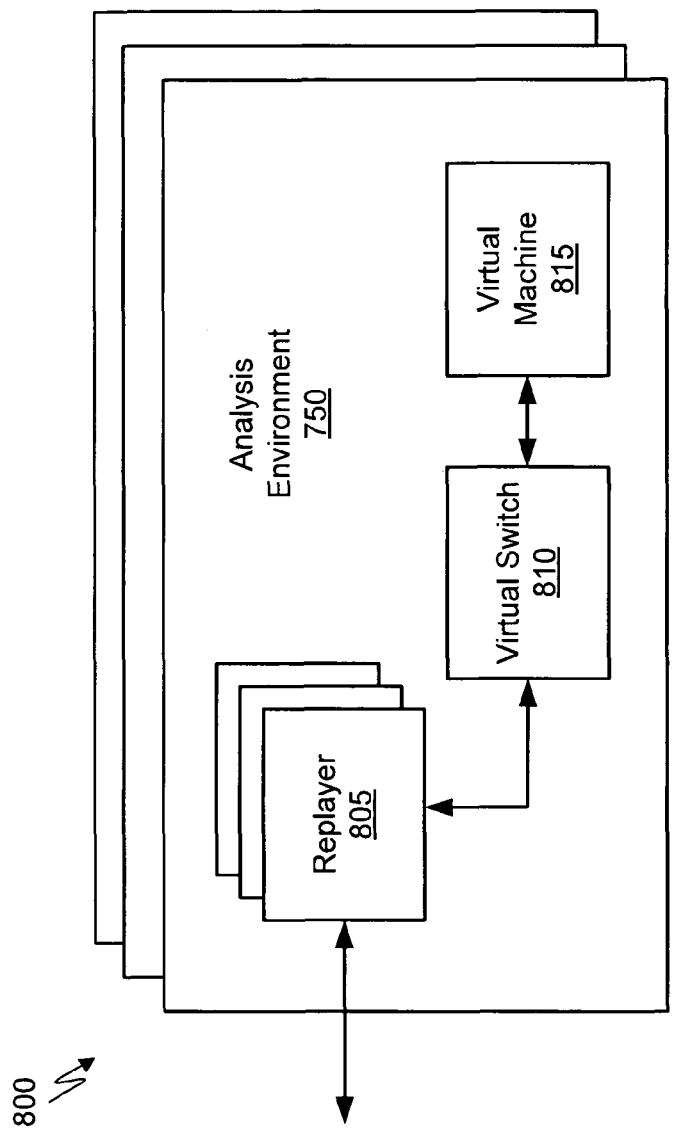
FIG. 8 depicts an analysis environment, in accordance with one embodiment of the present invention.

FIG. 8 depicts an analysis environment 750, in accordance with one embodiment of the present invention. The analysis environment 750 comprises a replayer 805, a virtual switch 810, and a virtual machine 815. The replayer 805 receives network data that has been flagged by the heuristic module 730 and replays the network data in the analysis environment 750. The replayer 805 is similar to the protocol sequence replayer 220 (FIG. 2). In some embodiments, the replayer 805 mimics the behavior of the source device 705 in transmitting the flagged network data. There can be any number of replayers 805 simulating network data between the source device 705 and the destination device 710. In a further embodiment, the replayer dynamically modifies session variables, as is appropriate, to emulate a "live" client or server of the protocol sequence being replayed. In one example, dynamic variables that may be dynamically substituted include dynamically assigned ports, transaction IDs, and any other variable that is dynamic to each protocol session.

The virtual switch 810 is software that is capable of forwarding packets of flagged network data to the virtual machine 815. In one example, the replayer 805 simulates the transmission of the data flow by the source device 705. The virtual switch 810 simulates the communication network 720 and the virtual machine 815 simulates the destination device 710. The virtual switch 810 can route the data packets of the data flow to the correct ports of the virtual machine 815.

The virtual machine 815 is a representation of the destination device that can be provided to the analysis environment 750 by the scheduler 735. In one example, the scheduler 735 retrieves a virtual machine 815 from the virtual machine pool 745 and configures the virtual machine 815 to mimic a destination device 7.10. The configured virtual machine 815 is then provided to the analysis environment 750 where it can receive flagged network data from the virtual switch 810.

As the analysis environment 750 simulates the transmission of the network data, behavior of the virtual machine 815 can be closely monitored for unauthorized activity. If the virtual machine 815 crashes, performs illegal operations, performs abnormally, or allows access of data to an unauthorized computer user, the analysis environment 750 can react. In some embodiments, the analysis environment 750 performs dynamic taint analysis to identify unauthorized activity (dynamic taint analysis is further described in FIG. 12.) In one example, the analysis environment 750 can transmit a command to the destination device 710 to stop accepting the network data or data flows from the source device 705.

In some embodiments, the analysis environment 750 monitors and analyzes the behavior of the virtual machine 815 in order to determine a specific type of malware or the presence of an illicit computer user. The analysis environment 750 can also generate computer code configured to eliminate new viruses, worms, or other malware. In various embodiments, the analysis environment 750 can generate computer code configured to repair damage performed by malware or the illicit computer user. By simulating the transmission of suspicious network data and analyzing the response of the virtual machine, the analysis environment 750 can identify known and previously unidentified malware and the activities of illicit computer users before a computer system is damaged or compromised.

Figure 9:
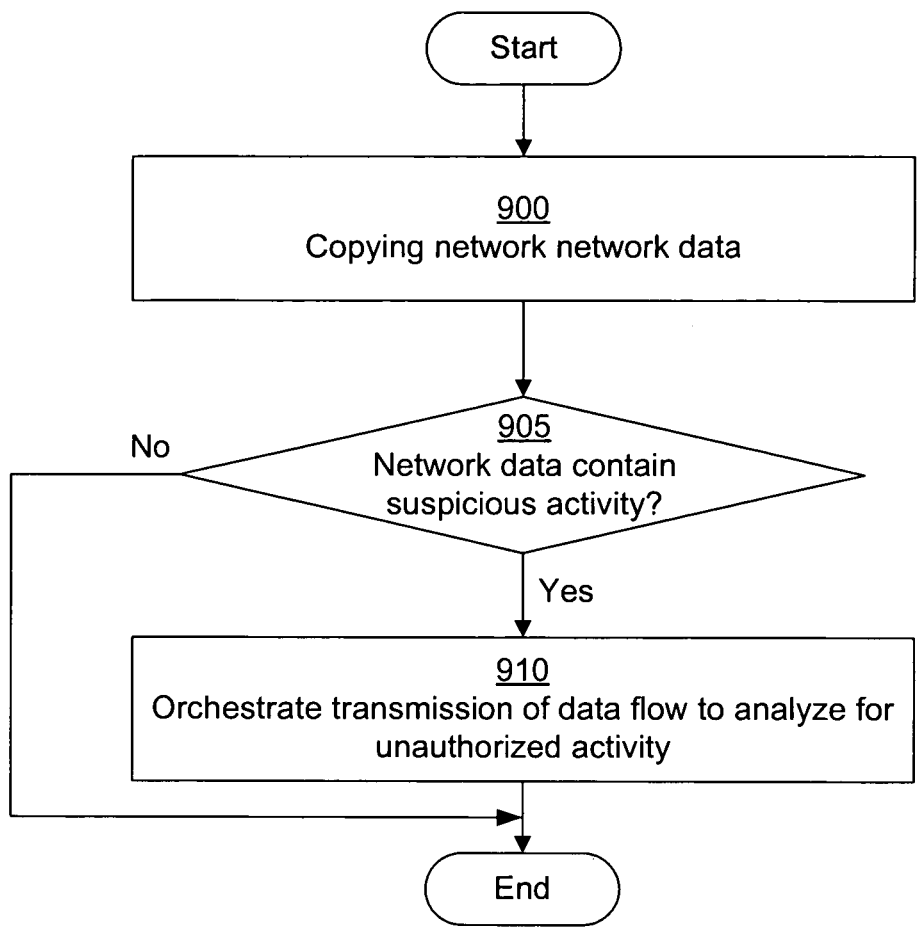
FIG. 9 depicts a flow chart for a method of detecting unauthorized activity, in accordance with one embodiment of the present invention.

FIG. 9 depicts a flow chart for a method of detecting unauthorized activity, in accordance with one embodiment of the present invention. In step 900, network data is copied. For example, the network data can be copied by a tap, such as the tap 715. In some embodiments, the tap 715 can be coupled directly to the source device 705, the destination device 710, or the communication network 720.

In step 905, the network data is analyzed to determine whether the network data is suspicious. For example a heuristic module, such as the heuristic module 730, can analyze the network data. The heuristic module can base the determination on heuristic and/or probabilistic analyses. In various embodiments, the heuristic module has a very low threshold to determine whether the network data is suspicious. For example, a single command within the network data directed to an unusual port of the destination device can cause the network data to be flagged as suspicious.

Step 905 can alternatively include flagging network data as suspicious based on policies such as the identity of a source device, a destination device, or the activity of the network data. In one example, even if the heuristic module does not flag the network data, the network data can be flagged as suspicious based on a policy if the network data was transmitted from a device that does not normally transmit network data. Similarly, based on another policy, if the destination device contains trade secrets or other critical data, then any network data transmitted to the destination device can be flagged suspicious. Similarly, if the network data is directed to a particularly important database or is attempting to gain rights or privileges within the communication network or the destination device, then the network data can be flagged as suspicious. In various embodiments, the policy engine 755 flags network data based on these and/or other policies.

In step 910, the transmission of the network data is orchestrated to analyze unauthorized activity. In one example, the transmission of the network data over a network is simulated to analyze the resulting action of the destination device. The simulation can be monitored and analyzed to identify the effects of malware or illegitimate computer use.

Figure 10:
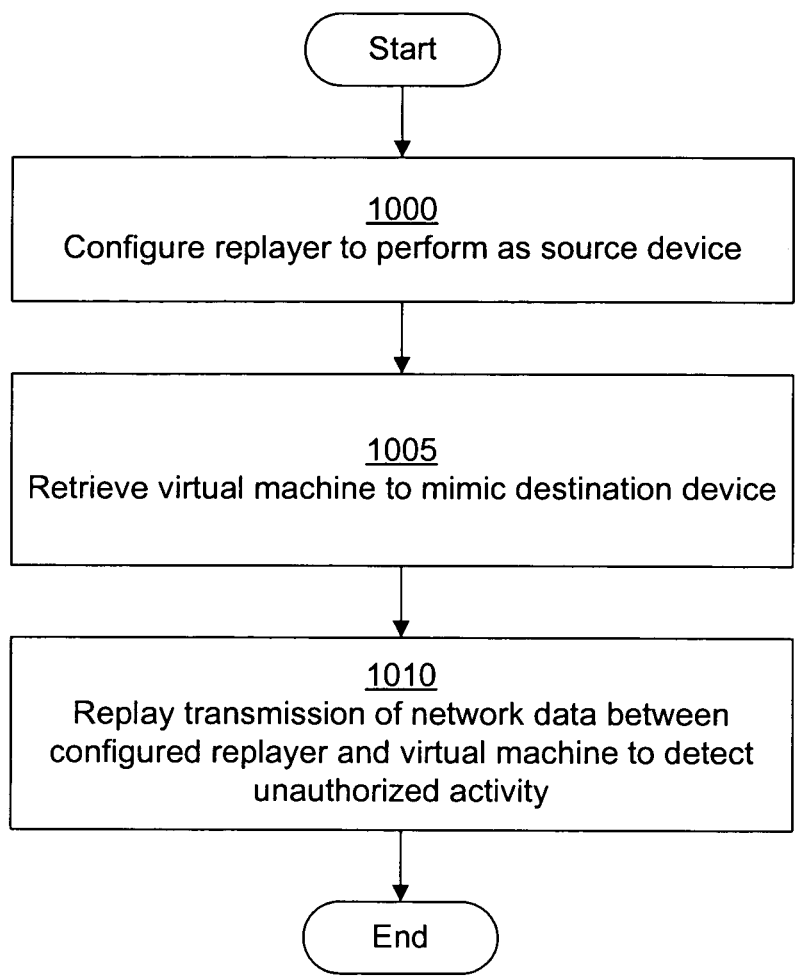
FIG. 10 depicts a flow chart for a method for orchestrating a response to network data, in accordance with one embodiment of the present invention.

FIG. 10 depicts a flow chart for a method for orchestrating the transmission of network data, in according with one embodiment of the present invention. In step 1000, the replayer 805 within the analysis environment 750 is configured to perform as the source device 705. In one example, the replayer 805 simply transmits the flagged network data to simulate network data transmission. There can be multiple replayers 805 transmitting different network data from a single source device 705. Alternately, there can be multiple replayers 805 that mimic different source devices 705 that transmit different network data.

In step 1005, a virtual machine 815 is retrieved and configured to mimic the destination device 710. The scheduler 735 identifies the destination device 710 and retrieves a virtual machine 815 from the virtual machine pool 745. In some embodiments, the scheduler 735 further configures the virtual machine 815 to mimic the performance characteristics of the destination device 710. The scheduler 735 than transmits the virtual machine 815 to the analysis environment 750.

In step 1010, the analysis environment 750 replays transmission of the network data between the configured replayer 805 and the virtual machine 815 to detect unauthorized activity. The replayer 805 is configured to simulate the source device 705 transmitting the network data and the virtual machine 815 is configured to mimic the features of the destination device 710 that is affected by the network data. The virtual switch 810 can simulate the communication network 720 in delivering the network data to the destination device 710.

As the transmission of the network data on the model destination device 710 is simulated, results are monitored to determine if the network data is generated by malware or activity generated by an illegitimate computer use. In one example, if the network data attempts to replicate programs within the virtual machine 815, then a virus can be identified. In another example, if the network data constantly attempts to access different ports of the virtual machine 815, then a worm or hacker can be identified.

Since the effects of network data transmission is simulated and the result analyzed, the controller 725 need not wait for repetitive behavior of malware or computer hackers before detecting their presence. In some examples of the prior art, new viruses and hackers are detected only upon multiple events that cause similar damage. By contrast, in some embodiments, a single data flow can be flagged and identified as harmful within a simulation thereby identifying malware, hackers, and unwitting computer users before damage is done.

Figure 11:
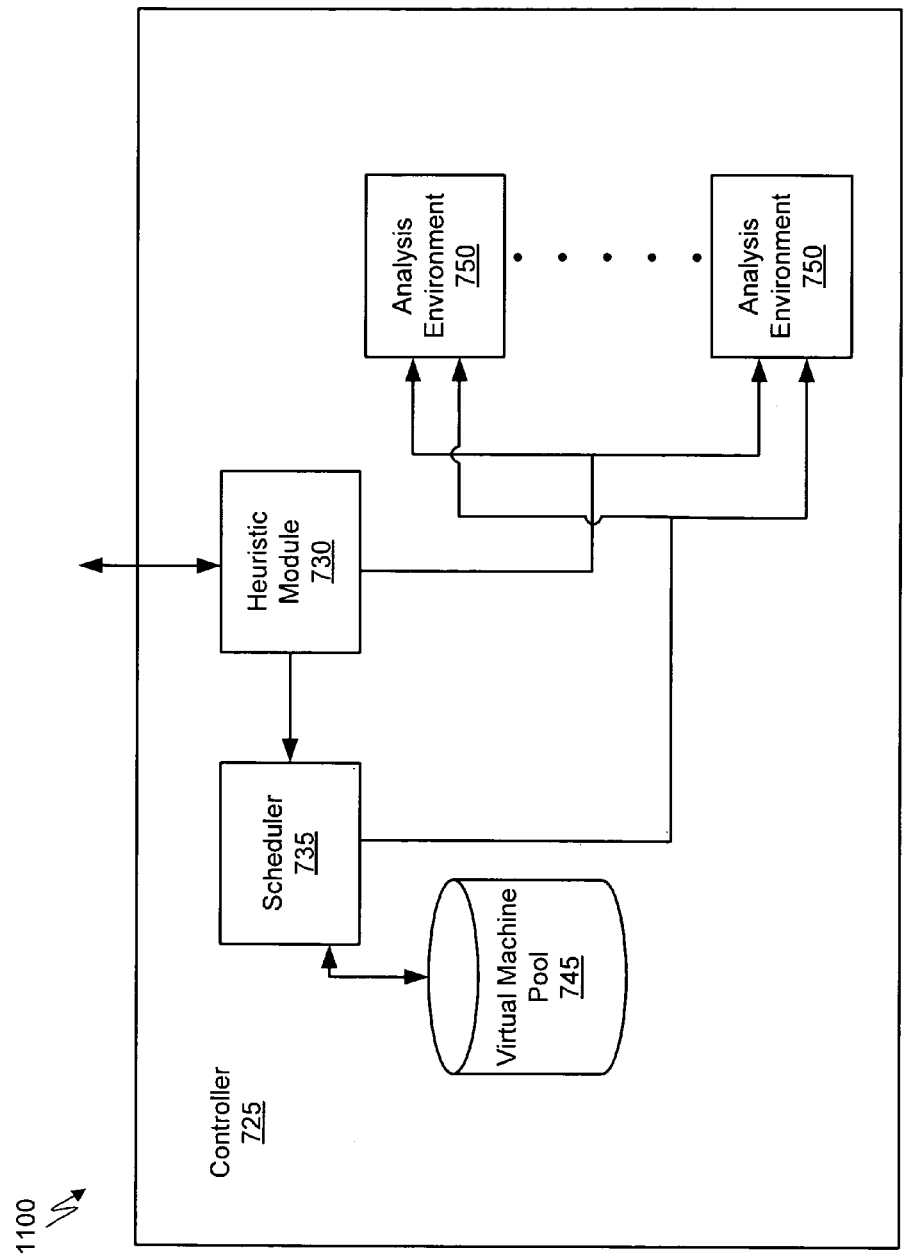
FIG. 11 depicts a controller of an unauthorized activity detection system, in accordance with one embodiment of the present invention.

FIG. 11 depicts a controller 725 of an unauthorized activity detection system 1100, in accordance with one embodiment of the present invention. The controller 725 can receive a variety of network data from the tap 715 (FIG. 7). In exemplary embodiments, the controller 725 concurrently processes different network data. In some embodiments, the controller 725 processes the different network data nearly simultaneously (e.g., in parallel). In other embodiments, the controller 725 processes the different network data serially but the processing of the different network data may be interwoven as resources allow. As a result, the controller 725 may receive and analyze different network data from the communication network 720 without appreciable interference on the data traffic in the communication network 720.

In some embodiments, the controller 725 can concurrently receive first and second network data where the second network data is different from the first. In one example, the tap 715 concurrently sends the first and second network data to the controller 725. In another example, the tap 715 sends first network data and the second network data to the controller 725 at approximately the same time. The tap 715 may comprise multiple taps capable of sending different network data in parallel or serial to the controller 725.

The controller 725 can concurrently process the first network data and the second network data. In some embodiments, the controller 725 can process the first network data and the second network data simultaneously. In one example, the controller 725 is software on a computer with two or more processors capable of independent processing. In other embodiments, the controller 725 can process the first network data and the second network data serially. For example, the controller 725 is software on a computer with a single processor capable of interleaving commands associated with the first network data and the other commands associated with the second network data. As a result, the processing of the first network data and the second network data may appear to be simultaneous. Although the processing of two different forms of network data (i.e., first network data and second network data) is discussed, there can be any number of different network data processed by the controller 725 during any time.

The controller 725 can comprise a heuristic module 730, a scheduler 735, a virtual machine pool 745, and a plurality of analysis environments 750. The heuristic module 730 concurrently receives the copy of the first network data and a copy of the second network data from the tap 715. In some embodiments, the heuristic module 730 can receive different network data in parallel from the tap 715. The heuristic module 730 applies heuristics and/or probability analysis to determine if the first network data and/or the second network data might contain suspicious activity.

In other embodiments, the heuristic module 730 serially applies heuristics and/or probabilistic analysis to both the first network data and the second network data. In one example, the heuristic module 730 may apply various heuristics to determine if the first network data contains suspicious activity while a variety of other network data is determined as being not suspicious.

The heuristic module 730 can independently apply heuristics and probability analysis to different network data. In one example, the heuristic module 730 flags network data as suspicious and proceeds to receive new network data as the other network data continues to be analyzed. The network data flagged as suspicious can then be buffered and organized into a data flow. The data flow is then provided to the scheduler 735.

The heuristic module 730 may comprise an optional buffer to buffer the network data flagged a suspicious. The buffer may be controlled so as to hold network data as resources are otherwise occupied. In one example, the buffer may hold network data if the scheduler 735 capacity has already been maximized. Once the scheduler 735 frees capacity, the buffer may release some or all buffered network data to the scheduler 735 as needed.

The heuristic module 730 can retain data packets belonging to a variety of different network data previously copied by the tap 715. The data packets may be a part of data flows from the first network data, the second network data, or any other network data copied by the tap 715. In some embodiments, the heuristic module 730 performs heuristic and/or probability analysis on a set of data packets belonging to a data flow and then stores the data packets within a buffer or other memory.

The scheduler 735 identifies the destination devices 710 to receive the first network data and/or the second network data and retrieves a plurality of virtual machines associated with the destination devices 710. In one example, a source device sends network data flagged as suspicious to two or more destination devices. The scheduler 735 configures a plurality of virtual machines to mimic the performance of each destination device, respectively.

Concurrently with configuring the first plurality of virtual machines for the first network data, the scheduler 735 can configure a second plurality of virtual machines to mimic the performance of other destination devices receiving the second network data. In one example, the scheduler 735 can perform these tasks simultaneously. The first plurality of virtual machines and the second plurality of virtual machines can be retrieved from the virtual machine pool 745.

The virtual machine pool 745 is configured to store virtual machines. The virtual machine pool 745 can be any type of storage capable of storing software. In one example, the virtual machine pool 745 stores a plurality of virtual machines that can be configured by the scheduler 735 to mimic the performance of a plurality of destination devices 710 that receive network data on the communication network 720. The virtual machine pool 745 can store any number of distinct virtual machines that can be configured to simulate the performance of any destination devices 710.

The analysis environments 750 simulate transmission of the network data between the source device 705 and the destination device 710 to analyze the effects of the network data upon the destination device 710. The analysis environment 750 can identify the effects of malware or illegitimate computer users (e.g., a hacker, computer cracker, or other computer user) by analyzing the simulation of the effects of the network data upon the destination device 710 that is carried out on the virtual machine. There can be multiple analysis environments 710 to simulate different network data.

Although FIG. 11 depicts only two analysis environments 750, there may be any number of analysis environments 750 within controller 725. In one example, there may be as many analysis environments 750 as there are different network data to analyze. The analysis environments 750 can operate concurrently and independently with each other. The analysis environments 750 are further discussed with respect to FIG. 12.

Figure 12:
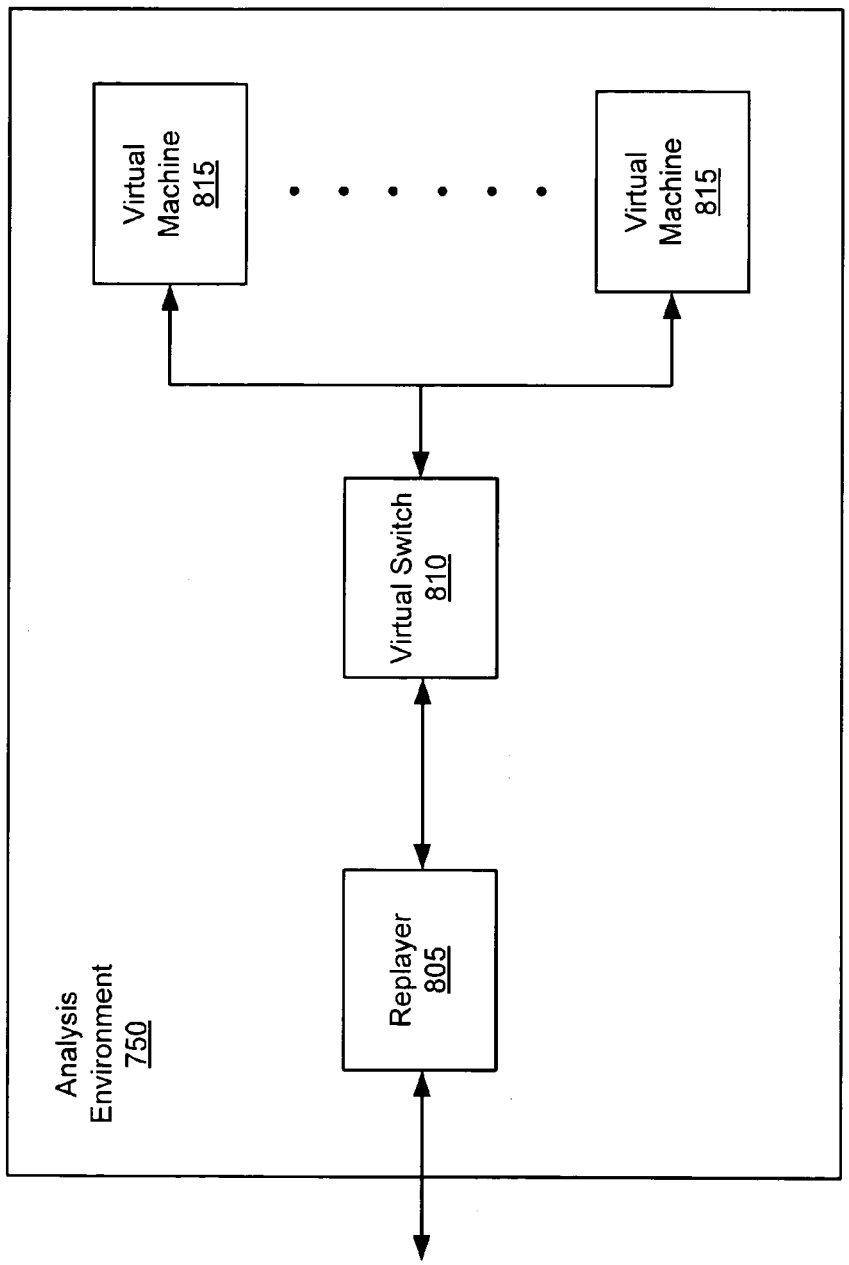
FIG. 12 depicts an analysis environment, in accordance with one embodiment of the present invention.

FIG. 12 depicts an analysis environment 750, in accordance with one embodiment of the present invention. In exemplary embodiments, each different analysis environment 750 can analyze different network data concurrently. While one analysis environment 750 analyzes network data for suspicious activity, another analysis environment 750 may independently analyze other network data. A single analysis environment 750 can analyze network data broadcast to multiple destination devices.

The analysis environment 750 comprises a replayer 805, a virtual switch 810, and a plurality of virtual machines 815. The replayer 805 receives network data that has been flagged by the heuristic module 730 and replays the network data in the analysis environment 750. In some embodiments, the replayer 805 mimics the behavior of the source device 705 in transmitting the flagged network data to a plurality of destination devices. There can be any number of replayers 805 simulating network data between the source device 705 and the destination device 710.

The virtual switch 810 is software that is capable of forwarding packets of flagged network data to the plurality of virtual machines 815. In one example, the replayer 805 simulates the transmission of the data flow by the source device 705. The virtual switch 810 simulates the communication network 720 and the plurality of virtual machines 815 mimic the plurality of destination devices 710. The virtual switch 810 can route the data packets of the data flow to the correct ports of any of the plurality of virtual machines 815. There may be any number of virtual switches 810.

In some embodiments, the virtual switch 810 concurrently routes data packets to any number of the plurality of virtual machines 815. In one example, the virtual switch 810 independently routes data packets belonging to network data to two or more of the plurality of virtual machines 815. In another example, the virtual switch 810 serially routes the data packets to two or more of the plurality of virtual machines 815.

The plurality of virtual machines 815 is a representation of the plurality of destination devices, each of which is to receive the same network data. The scheduler 735 provides the plurality of virtual machines 815 to the analysis environment 750. In one example, the scheduler 735 retrieves the plurality of virtual machines 815 from the virtual machine pool 745 and configures each of the plurality of virtual machines 815 to mimic a separate destination device 710 that is to receive the network data. Although only two virtual machines 815 are depicted in FIG. 12, there can be any number of virtual machines 815.

As the analysis environment 750 simulates the transmission of the network data, behavior of the plurality of virtual machines 815 can be monitored for unauthorized activity. If any of the plurality of virtual machines 815 crashes, performs illegal operations, performs abnormally, or allows access of data to an unauthorized computer user, the analysis environment 750 can react. In one example, the analysis environment 750 can transmit a command to any destination device 710 to stop accepting the network data or data flows from any source device 705.

In some embodiments, the analysis environment 750 performs dynamic taint analysis to identify unauthorized activity. For an unauthorized computer user to change the execution of an otherwise legitimate program, the unauthorized computer user must cause a value that is normally derived from a trusted source to be derived from the user's own input. Program values (e.g., jump addresses and format strings) are traditionally supplied by a trusted program and not from external untrusted inputs. An unauthorized computer user, however, may attempt to exploit the program by overwriting these values.

In one example of dynamic taint analysis, all input data from untrusted or otherwise unknown sources are flagged. Program execution of programs with flagged input data is then monitored to track how the flagged data propagates (i.e., what other data becomes tainted) and to check when the flagged data is used in dangerous ways. For example, use of tainted data as jump addresses or format strings often indicates an exploit of a vulnerability such as a buffer overrun or format string vulnerability.

Figure 13:
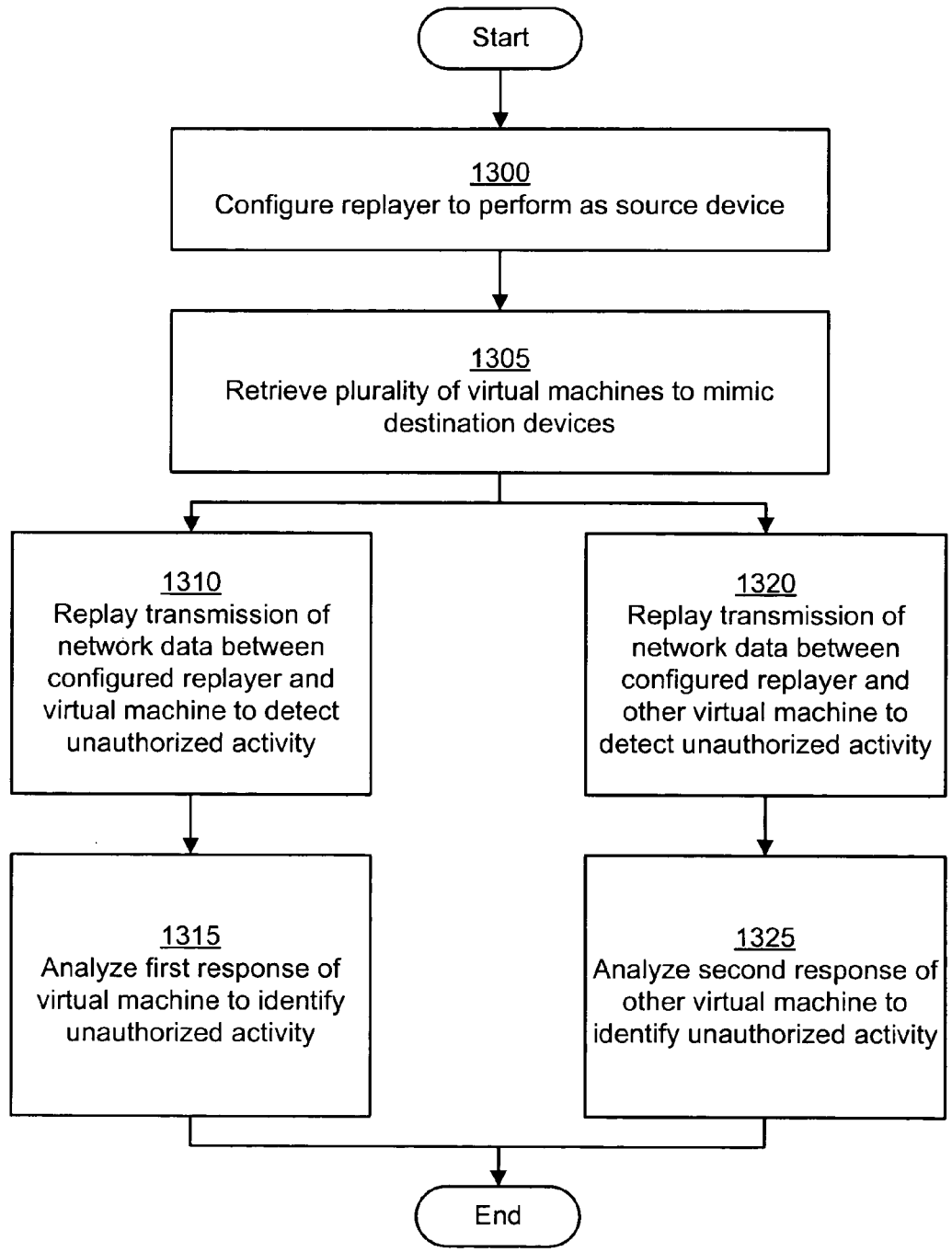
FIG. 13 depicts a flow chart for a method for concurrently orchestrating a response to network data, in accordance with one embodiment of the present invention.

FIG. 13 depicts a flow chart for a method for concurrently orchestrating a response to network data by a plurality of virtual machines, in accordance with one embodiment of the present invention. Network data, received by a tap 715, can be transmitted from a single source device 705 to a plurality of destination devices 710.

In step 1300, the replayer 805 within the analysis environment 750 is configured to perform as the source device 705. In one example, the replayer 805 simply transmits the flagged network data to two or more virtual machines to simulate network data transmission. In some embodiments, the replayer 805 can transmit flagged network data in parallel to the two or more virtual machines. In other embodiments, the replayer 805 can also transmit flagged network data in serial or interleave the transmission of flagged network data to one virtual machine with the transmission of the same flagged network data to another virtual machine. In some embodiments, there can be multiple replayers 805 transmitting different network data.

In step 1305, a plurality of virtual machines 815 is retrieved and configured to mimic a plurality of destination devices 710. The scheduler 735 identifies the destination devices 710 and retrieves the plurality of virtual machines 815 from the virtual machine pool 745. The scheduler 735 than transmits the plurality of virtual machines 815 to the analysis environment 750.

In step 1310, the analysis environment 750 replays transmission of the network data between the configured replayer 805 and at least one virtual machine 815 of the plurality of virtual machines 815 to detect unauthorized activity. In step 1315, the analysis environment 750 analyzes a first response of the at least one virtual machine 815 to identify unauthorized activity.

In step 1320, the analysis environment 750 replays transmission of the network data between the configured replayer 805 and at least one other virtual machine to detect unauthorized activity. In step 1325, the analysis environment 750 analyzes a second response of the at least one other virtual machine 815 to identify unauthorized activity.

Steps 1310 and 1315 can be performed concurrently with steps 1320 and 1325. In some embodiments, steps 1310-1315 and steps 1320-1325 are performed by software as resources allow. In some embodiments, steps 1310-1315 and steps 1320-1325 are performed in parallel.

Figure 14:
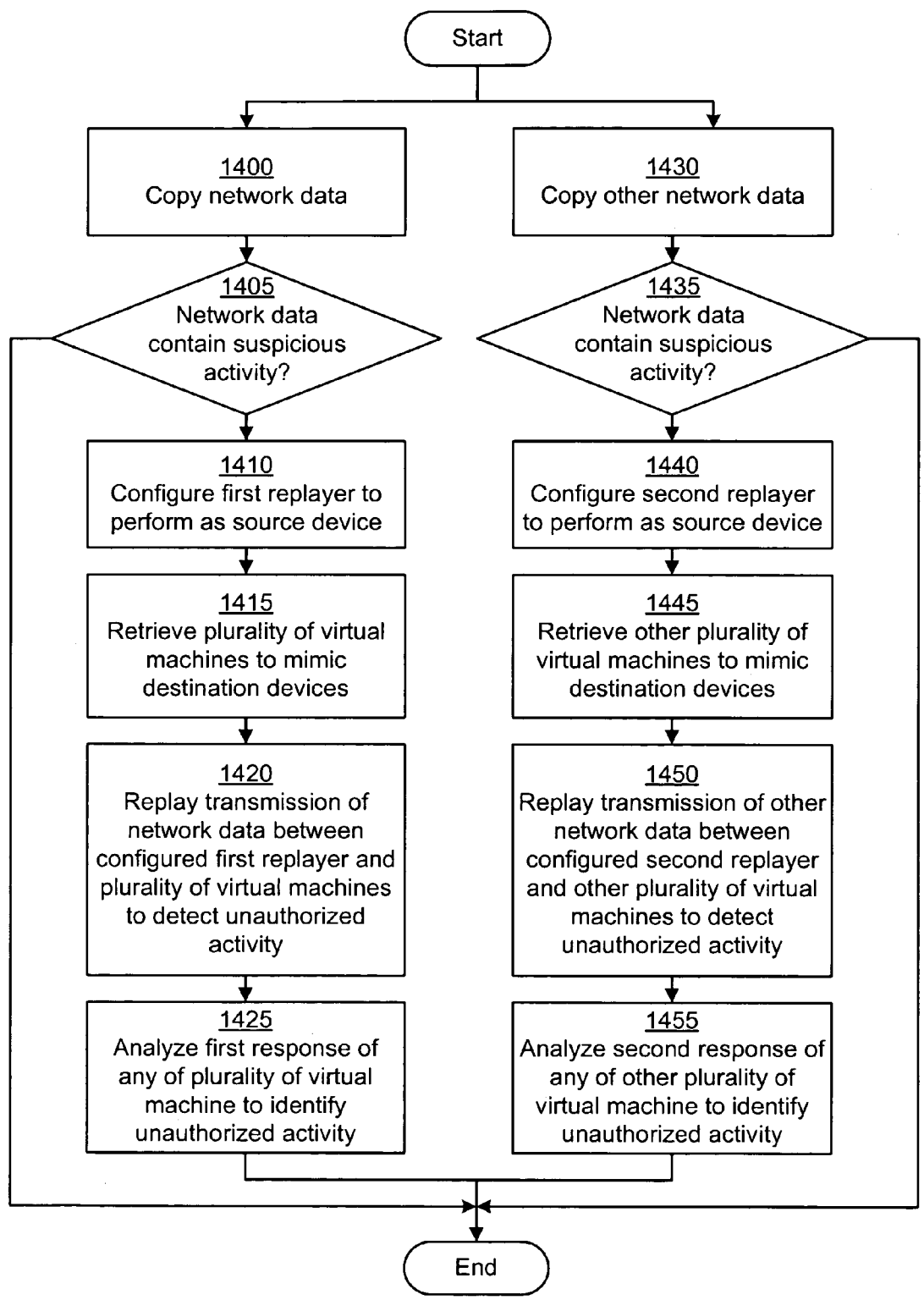
FIG. 14 depicts a flow chart for a method for concurrently identifying unauthorized activity, in accordance with one embodiment of the present invention.

FIG. 14 depicts a flow chart for a method for concurrently identifying unauthorized activity, in accordance with one embodiment of the present invention. In step 1400, tap 715 copies network data directed to a plurality of destination devices 710 on the communication network 720. In step 1405, the network data is analyzed with a heuristic to detect suspicious activity. If suspicious activity is not detected, then FIG. 14 ends. If suspicious activity is detected, a first replayer 805 is configured to perform as the source device 705 to transmit the network data in step 1410. In step 1415, a plurality of virtual machines 815 is retrieved to mimic the plurality of destination devices 710. Transmission of the network data is replayed between the first replayer 805 and the plurality of virtual machines 815 to detect unauthorized activity in step 1420. In step 1425, a response is analyzed by any of the plurality of virtual machines 815 to the network data to identify unauthorized activity.

Similarly, in step 1430, tap 715 copies other network data directed to an other plurality of destination devices 710 on the communication network 720. In some embodiments, the other plurality of destination devices 710 are the same plurality destination devices referred to within step 1400. In one example, step 1400 a tap 715 copies network data transmitted to a plurality of destination devices 710 while in step 1405, the tap 715 copies different network data transmitted to the same plurality of destination devices 710. In another example, the other network data referred to within 1405 is transmitted to some but not all of the plurality of destination devices 710 identified in step 1400.

In step 1435, the other network data is analyzed with a heuristic to detect suspicious activity. If suspicious activity is not detected, then FIG. 14 ends. If suspicious activity is detected, a second replayer 805 is configured to perform as the source device 705 to transmit the other network data in step 1440. In step 1445, an other plurality of virtual machines 815 is retrieved to mimic the plurality of destination devices 710. The other plurality of virtual machines 815 may comprise some, all, or none of the virtual machines 815 within the plurality of virtual machines 815 discussed in step 1415.

Transmission of the network data is replayed between the second replayer 805 and the other plurality of virtual machines to detect unauthorized activity in step 1450. In step 1455, a second response is analyzed by any of the other plurality of virtual machines 815 to the network data to identify unauthorized activity.

Steps 1430 through 1455 can occur concurrently with steps 1400 through 1425. In some embodiments, steps 1430 through 1455 are performed in parallel with steps 1400 through 1425. In other embodiments, the performance of steps 1430 through 1455 is interwoven with the performance of steps 1400 through 1425 as resources allow. In one example, step 1410 is performed during and/or in between any of steps 1405 through 1455.

In the foregoing specification, the invention is described with reference to specific embodiments thereof, but those skilled in the art will recognize that the invention is not limited thereto. Various features and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. An unauthorized activity capture system comprising:
a tap configured to copy network data from a communication network, the network data being associated with an original destination; and
a controller coupled to the tap and configured to receive the copy of the network data from the tap, analyze the copy of the network data with a heuristic to determine if at least a portion of the copy of the network data has one or more characteristics of a computer worm, flag the at least a portion of the copy of the network data as suspicious based on the heuristic determination, and concurrently replay transmission of the flagged, suspicious copy of the network data to a plurality of destination devices, wherein the plurality of destination devices are configured based on the original destination.

2. The system of claim 1 wherein the heuristic is configured to detect a plurality of instances of the network data being sent to an invalid internet protocol address.

3. The system of claim 1 wherein the tap is further configured to copy other network data from the communication network.

4. The system of claim 3 wherein the controller is further configured to receive the copy of the other network data from the tap, analyze the copy of the other network data with a heuristic to determine if at least a portion of the copied other network data is suspicious, flag the at least a portion of the copied other network data as suspicious based on the heuristic determination, concurrently simulate transmission of the other network data to an other plurality of destination devices, and concurrently analyze a first response from the plurality of destination devices and a second response from the other plurality of destination devices.

5. An unauthorized activity capture system comprising:
a tap configured to copy network data from a communication network; and
a controller configured to receive the copy of the network data from the tap, analyze the copy of the network data with a heuristic to determine which part of the copied network data is suspicious network data, where the suspicious network data has one or more characteristics of a computer worm, retrieve a plurality of virtual machines, configure a first replayer to concurrently replicate transmission of the suspicious network data to the plurality of virtual machines, and analyze a first response to the transmitted suspicious network data by any of the plurality of virtual machines to identify unauthorized activity by dynamic taint analysis.

6. The system of claim 5 wherein the controller is configured to concurrently analyze a first response by any of the plurality of virtual machines and a second response by at least one other of the plurality of virtual machines to identify unauthorized activity.

7. The system of claim 5 wherein the heuristic is configured to detect a plurality of instances of the network data being sent to an invalid internet protocol address.

8. The system of claim 5 wherein the unauthorized activity is the result of malware associated with the network data.

9. The system of claim 5 wherein the unauthorized activity is the result of a hacker associated with the network data.

10. The system of claim 5 wherein the network data is replicated between the replayer and the plurality of virtual machines over a virtual switch.

11. The system of claim 5 wherein the tap is further configured to copy other network data from the communication network.

12. The system of claim 11 wherein the controller is further configured to receive the copy of the other network data from the tap, analyze the copy of the other network data with a heuristic, retrieve an other plurality of virtual machines, configure a second replayer to concurrently replicate the other network data to the other plurality of virtual machines, and concurrently analyze a first response by any of the plurality of virtual machines and a second response by any of the other plurality of virtual machines to identify unauthorized activity.

13. The system of claim 12 wherein the controller further comprises a virtual machine pool configured to store the plurality of virtual machines and the other plurality of virtual machines.

14. An unauthorized activity capture method comprising:
copying network data from a communication network, the network data being associated with an original source;
analyzing the copied network data with a heuristic to determine if at least a portion of the copied network data has one or more characteristics of a computer worm;
classifying the original source as a suspicious source based on association with the suspicious copied network data; and
concurrently replaying the transmission of the network data from the suspicious source to a plurality of destination devices to identify unauthorized activity by tracking how the network data from the suspicious source is used by the plurality of destination devices.

15. The method of claim 14 wherein concurrently replaying the transmission of the network data from the suspicious source to a plurality of destination devices comprises:
retrieving a plurality of virtual machines configured to receive the suspicious at least a portion of the network data;
configuring a first replayer to concurrently transmit the suspicious at least a portion of the network data to the plurality of virtual machines; and
analyzing a first response by any of the plurality of virtual machines to identify unauthorized activity.

16. The method of claim 14 further comprising:
copying other network data from the communication network;
analyzing the copied other network data with a heuristic to determine if at least a portion of the other network data is suspicious;
concurrently replaying the transmission of the suspicious at least a portion of the other network data to an other plurality of destination devices; and
concurrently analyzing a first response to the suspicious at least a portion of the network data and a second response to the other suspicious at least a portion of the network data to identify unauthorized activity.

17. The method of claim 16 further comprising:
retrieving an other plurality of virtual machines configured to receive the other copied network data;
configuring a second replayer to concurrently transmit the other copied network data to the other plurality of virtual machines; and
concurrently analyzing the first response by any of the plurality of virtual machines and a second response by any of the other plurality of virtual machines to identify unauthorized activity.

18. The method of claim 15 further comprising concurrently analyzing the first response by any of the plurality of virtual machines and a second response by any other of the plurality of virtual machines.

19. The method of claim 14 wherein the heuristic is configured to detect a plurality of instances of the at least a portion of network data being sent to an invalid internet protocol address.

20. The method of claim 14 wherein identifying the unauthorized activity includes identifying malware associated with the network data from the suspicious source.

21. The method of claim 14 wherein identifying the unauthorized activity includes identifying of a hacker associated with the network data from the suspicious source.

22. The method of claim 15 wherein the network data from the suspicious source is transmitted between the replayer and the virtual machine over a virtual switch.

23. The method of claim 15 wherein retrieving the virtual machine includes accessing a virtual machine pool.

24. A non-transitory computer readable medium for storing computer readable code, the computer readable code configured to be executed by a processor to perform a method for analyzing data, the method comprising:
   directing a processor to copy network data from a communication network, the network data being associated with an original destination;
   analyzing the copied network data with a heuristic to determine if at least a portion of the network data has one or more characteristics of a computer worm; and
   concurrently replaying transmission of the suspicious at least a portion of network data to a plurality of destination device to identify unauthorized activity.

25. The non-transitory computer readable medium of claim 24 wherein concurrently replaying transmission of the suspicious at least a portion of network data comprises directing the processor to retrieve a plurality of virtual machines configured to receive the suspicious at least a portion of network data, configure a replayer to concurrently transmit the suspicious at least a portion of network data to the plurality of virtual machines, and concurrently simulate the transmission of the suspicious at least a portion of network data to the plurality of virtual machines.

26. The non-transitory computer readable medium of claim 25 wherein the computer readable code is further configured to direct a processor to copy other network data from a communication network, analyze the copied other network data with a heuristic to determine if at least a portion of the other network data is suspicious, concurrently replay transmission of the suspicious at least a portion of the other network data to an other plurality of destination device to identify unauthorized activity, and concurrently analyze a first response to the suspicious at least a portion of network data and a second response to the suspicious at least a portion of the other network data.

27. The non-transitory computer readable medium of claim 26 wherein concurrently analyzing a first response to the suspicious at least a portion of the network data and a second response to the suspicious at least a portion of the other network data comprises directing the processor to retrieve an other plurality of virtual machines configured to receive the suspicious at least a portion of the other network data, configure a replayer to concurrently transmit the suspicious at least a portion of the other network data to the other plurality of virtual machines, simulate the transmission of the suspicious at least a portion of the other network data to the other plurality of virtual machines, and concurrently analyze a first response of any of the plurality of virtual machines and a second response of any of the other plurality of virtual machines to identify unauthorized activity.

* * * * *